(12) United States Patent
Wiklof et al.

(10) Patent No.: US 7,428,997 B2
(45) Date of Patent: Sep. 30, 2008

(54) METHOD AND APPARATUS FOR ILLUMINATING A FIELD-OF-VIEW AND CAPTURING AN IMAGE

(75) Inventors: Christopher A. Wiklof, Everett, WA (US); Clarence T. Tegreene, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 44 days.

(21) Appl. No.: 10/630,062

(22) Filed: Jul. 29, 2003

(65) Prior Publication Data
US 2005/0023356 A1 Feb. 3, 2005

(51) Int. Cl.
G06K 7/10 (2006.01)
(52) U.S. Cl. .............................. 235/462.42; 235/462.25
(58) Field of Classification Search ............ 235/462.01, 235/462.1, 462.11, 462.24, 462.25, 462.26, 235/462.42, 462.45, 472.02, 462
See application file for complete search history.

(56) References Cited

U.S. PATENT DOCUMENTS

| | | | |
|---|---|---|---|
| 4,387,297 A | | 6/1983 | Swartz et al. |
| 4,539,664 A | * | 9/1985 | Deguchi et al. .......... 369/30.16 |
| 4,591,918 A | | 5/1986 | Hisano et al. |
| 4,969,038 A | * | 11/1990 | Lemelson ................... 382/141 |
| 5,448,330 A | | 9/1995 | Takagi et al. |
| 5,463,211 A | * | 10/1995 | Arends et al. .......... 235/462.27 |
| 5,478,997 A | * | 12/1995 | Bridgelall et al. ...... 235/462.25 |
| 5,504,722 A | * | 4/1996 | Tanaka et al. ............ 369/13.32 |
| 5,714,750 A | | 2/1998 | Eastman et al. |
| 5,834,760 A | | 11/1998 | Ackley et al. |
| 6,140,979 A | | 10/2000 | Gerhard et al. |
| 6,245,590 B1 | * | 6/2001 | Wine et al. ..................... 438/52 |
| 6,285,489 B1 | | 9/2001 | Helsel et al. |
| 6,293,468 B1 | | 9/2001 | Rantze et al. |
| 6,323,942 B1 | * | 11/2001 | Bamji ........................ 356/5.01 |
| 6,331,909 B1 | | 12/2001 | Dunfield |

(Continued)

FOREIGN PATENT DOCUMENTS

EP 0794454 9/1997

(Continued)

OTHER PUBLICATIONS

International Search Report for PCT/US2005/002533 mailed Oct. 12, 2005.

*Primary Examiner*—Daniel St. Cyr
(74) *Attorney, Agent, or Firm*—Kevin D. Wills

(57) ABSTRACT

A variable illuminator, for instance a device for scanning a beam of light, emits a selected amount of power to a plurality of spots across a field of view. The amount of power is determined as inversely proportional to the apparent brightness of each spot. In the case where the spot size is equal to pixel size, the device may operate with a non-imaging detector. In the case where pixel size substantially equals spot size, the output of the variable illuminator may be converged to produce a substantially uniform detector response and the image information is determined as the inverse of a frame buffer used to drive the variable illuminator. The illuminator and detector may be driven synchronously. In the case where an imaging detector is used, the variable illumination may be used to compress the dynamic range of the field of view to substantially within the dynamic range of the imaging detector.

14 Claims, 16 Drawing Sheets

U.S. PATENT DOCUMENTS

| | | |
|---|---|---|
| 6,362,912 B1 | 3/2002 | Lewis et al. |
| 6,384,406 B1 | 5/2002 | Wine et al. |
| 6,390,370 B1 | 5/2002 | Plesko |
| 6,433,907 B1 | 8/2002 | Swanson et al. |
| 6,449,092 B1 | 9/2002 | Weber et al. |
| 6,464,633 B1 | 10/2002 | Seilchi et al. |
| 6,512,622 B2 | 1/2003 | Wine et al. |
| 6,515,278 B2 | 2/2003 | Wine et al. |
| 6,515,781 B2 | 2/2003 | Lewis et al. |
| 6,525,310 B2 | 2/2003 | Dunfield |
| 2002/0186221 A1 | 12/2002 | Bell |
| 2003/0001955 A1 | 1/2003 | Holz et al. |

FOREIGN PATENT DOCUMENTS

| | | |
|---|---|---|
| WO | WO 02/05549 A1 | 1/2002 |

\* cited by examiner

METHOD AND APPARATUS FOR ILLUMINATING A FIELD-OF-VIEW AND CAPTURING AN IMAGE

CROSS-REFERENCE TO RELATED APPLICATIONS

This application claims priority benefit from U.S. patent application Ser. No. 10/304,724, filed Nov. 25, 2002, now U.S. Pat. No. 6,653,621; which depends from U.S. patent application Ser. No. 09/816,809, filed Mar. 24, 2001, now U.S. Pat. No. 6,515,278; which depends from U.S. patent application Ser. No. 09/369,674, filed on Aug. 5,1999, now U.S. Pat. No. 6,245,590.

BACKGROUND OF THE INVENTION

The field of imaging can be divided into one-dimensional (1D) or linear imaging, two-dimensional (2D) imaging, and three-dimensional imaging.

Examples of 1D imagers include bar code devices using linear pixelated detectors, including for instance charge-coupled-device (CCD) and complementary-metal-oxide-silicon (CMOS) detectors. Linear pixelated imagers typically include illumination to reduce exposure time and ambient lighting requirements, often in the form of a sheet of light formed by a light emitting diode (LED) or LED array. Line-Scan cameras are a specific type of 1D pixelated imager. In line-scan cameras, a second dimension, usually perpendicular to the detector array, is provided by movement of the object or phenomenon being photographed.

2D imagers are used for myriad applications, including for instance, automated inspection, automated vehicle guidance, 2D symbol reading, omni-directional linear symbol reading, document capture, signature capture, endoscopic and laparoscopic visualization, and many other important applications. The most familiar form of 2D imaging is perhaps the digital camera, available in both still and video variants. Generally, 2D imagers use 2D pixelated arrays such as 2D CCD and 2D CMOS detectors. Often, 2D imagers include illuminators to improve low-light performance, depth-of-field, and motion blur immunity. 2D imagers are characterized by field-of-view (FOV) having both height and width.

Both linear and 2D imagers commonly trade off several performance characteristics including depth-of-field, resolution, and motion blur immunity. Frequently, designers choose to add illumination to the system. In such situations, peak power consumption and illuminator cost vs. DOF may be regarded as design trade-offs.

In typical pixelated imagers, each pixel in an array receives light energy from a conjugate point in the field-of-view for a selected sampling interval. Each pixel converts light to electrical charge that accumulates proportionally to the brightness of its conjugate point.

Another familiar field of imaging is that of film photography. Film photography is widely practiced and widely understood in terms of the trade-offs between depth-of-field (determined by lens f-stop), motion blur immunity (determined by shutter speed), resolution, and dynamic range (both of the latter determined largely by film chemistry and film speed). Flash photography adds illumination to the field-of-view to enable operation in dark or fast-moving environments. Unfortunately, flash photography suffers from dynamic range issues, having a tendency to overexpose nearby objects while underexposing distant parts of the FOV.

Another field that relates to the present invention is that of laser scanning. Laser scanning systems scan a beam, typically a laser beam, over a surface and measure the light reflected from the beam. Generally, laser scanners detect light instantaneously scattered by the moving spot without imaging it onto a detector array. Rather, the size of the projected spot itself determines resolution and the detector may be of a non-imaging type such as a PIN photo-diode or the like. Some laser scanners sequentially form a non-coincident pattern of scan lines such as a raster pattern or a "starburst" pattern. These can be especially useful for multiple symbol and stacked 2D symbol reading, or omni-directional bar code reading, respectively.

Scanned beam systems, in the form of conventional linear (1D) bar code scanners have been in use since the mid-1970 s as fixed mount devices such as those used in grocery stores. By the early 1980 s, scanned beam systems had been adapted to hand held form as several bar code companies introduced helium-neon based hand held scanners, most commonly called laser scanners. In such systems, the pattern of received light is referred to as the scan reflectance profile and may be processed to decode bar code symbols through which the beam is scanned.

Scanned beam bar code systems have not generally heretofore been referred to as "imagers", because they generally do not capture an image per se. Instead, they continuously scan a beam and simply monitor the reflected light for a scan reflectance profile that is indicative of a bar code symbol.

In more recent times, scanning laser systems have found use in other image capture applications, such as scanning laser ophthalmoscopes and scanning microscopes.

Another related field is that of illumination systems for image capture. Used in still photography as well as cinematic and video photography, such illumination systems are used to achieve effects not possible with ambient light. Consumer systems typically include a simple strobe (for still photography) or incandescent light (for video photography) that emits more-or-less uniform light across the entire field-of-view. Often, the resulting images have too much contrast, foreground objects being over-exposed and the background underexposed. Commercial and industrial photographers and cinematographers frequently add multiple illuminators to a scene to try to recapture some of the ambiance that is lost in simple consumer systems. These attempts to manually manipulate the illumination intensity across the field of view are frequently laborious and require a high degree of artistry.

OVERVIEW OF THE INVENTION

In its various aspects, the present invention relates to imaging systems, to laser scanners, and to illumination systems that automatically create variable intensity illumination across the field-of-view, responsive to scene characteristics. It also relates to systems that capture and/or reproduce images with enhanced dynamic range and systems that accelerate the determination of optimal illumination.

In one aspect according to the invention a method and apparatus illuminates a field-of-view with a variable-intensity source; specifically, a source (or sources) that casts variable illumination energy across the field-of-view. The variable intensity source may be formed, for instance, by scanning one or more beams of light across at least portions of the field-of-view while modulating the intensity of the beam or beams. In this way, darker and/or more distant regions may be illuminated more while lighter and/or closer regions are illuminated less.

This may be especially advantageous for use with film cameras or digital cameras where it is desirable to compress the dynamic range of the scene enough to fit substantially within the dynamic range of the film or imaging array, respectively. Such dynamic range compression may also be desirable for pixelated imagers where data from the illuminator frame buffer is not available during the image recording process.

In another aspect, the color balance of a field-of-view or portions of a field-of-view may be modified by differentially illuminating the scene with illuminators of differing color.

In another aspect, a method and apparatus for variable intensity illumination may include or augment a substantially uniform illuminator. In this case, lighter and/or closer regions may be illuminated entirely or to a relatively greater degree by the quasi-uniform illuminator while darker and/or more distant regions receive some "boost" in their illumination levels by the variable intensity illuminator.

In other embodiments, variable illumination may be produced by an array of static illuminators, by a variable attenuation array, or by an array of scanned beams.

Variable illumination may operate on a pixel-by-pixel basis or on a more generalized basis. In the latter case, illumination spots may correspond to zones or regions in the field-of-view. Such zones or regions may correspond to a few specific pixels or may correspond to many pixels. For example, a 9×16 landscape aspect ratio field-of-view may be divided into 12 spots arranged as three zones vertically by four zones horizontally. Alternatively, illumination regions may correspond to small groups of pixels such as 2×2, 3×3 or larger arrays. The specific arrangement of illumination zones may be selected to correspond to the application requirements. For 1D imagers, it may be appropriate for the variable illumination to be operative within moderately sized groups of pixels comprising 25% or less of the linear FOV.

In "large spot" applications such as those that operate on a more generalized basis, it may be advantageous to select illumination patterns within the zones in such a way as to "smooth" the edges of each spot. A smooth roll-off of illumination at the edges of such zones may tend to reduce the abruptness of differential illumination between zones, yielding a more attractive or accurate rendition of the image.

When illumination is operative at a pixel-by-pixel basis, an individual spot being illuminated corresponds to only a single pixel of the image. In this case, it is possible to drive the illuminator in such a way that a portion, up to substantially all, of scene information is exhibited as the inverse of the data used to drive the variable illumination. At one limit, the field-of-view may be differentially illuminated to produce substantially uniform light scatter at a detector. In this case, image information may be retrieved wholly or substantially by a frame buffer used to drive the differential illuminator. This mode may be especially advantageous for non-imaging detectors such as PIN photodiodes, avalanche photodiodes, photomultiplier tubes, and the like.

Another aspect according to the invention is related to laser scanners, scanned beam imaging engines, and devices that use scanned beam systems. Bar code laser scanners of the prior art sometimes suffer from relatively poor immunity to variations in ambient light across the field-of-view, specular reflections from scanned surfaces, scanner orientation relative to the symbol surface, symbol environmental degradation, and other effects that hinder performance. In various aspects according to the present invention, these and other artifacts may be eliminated or minimized by modulating the laser intensity according to image attributes.

In another aspect, detector sensitivity modulation or diversification may augment or substitute for illuminator modulation.

In another aspect, a scanned beam imager may operate with enhanced dynamic range, even when using a detector with only modest dynamic range. In such cases, the dynamic range of the light source may substitute for extra dynamic range of the detector.

Another aspect of the invention relates to modulating output of the illuminator synchronously with modulating responsiveness of the detection system. The sinusoidal velocity profile of MEMS and other scanners, the high data rate of imaging systems, and/or the use of variable illuminator power can interact with how synchronous detection may be implemented.

It may be important, especially with fast moving scenes and when the implementation more closely resembles the leveled illumination mode, to minimize the amount of time it takes for the illumination system to converge, or arrive at the optimum illumination energy for each spot. Some aspects according to the present invention focus on methods and apparatus for speeding up convergence.

Another aspect relates to methods and apparatus for "probing" the field-of-view for image data. In this case, especially bright illumination may be switched on for an instant to determine the optical characteristics of one or a few dark or distant spots, and then switched off for a time sufficient to meet safety, covertness, or other requirements. During subsequent frames, other spots may be similarly probed.

Another aspect according to the invention relates to illuminator modulation being controlled by brightness variation.

Another aspect according to the invention relates to controlling the illuminator-to-detector coupling by pulse-width variation or phase synchronization. In some situations, it may be advantageous to modulate the illuminator(s) in a predictable way, thereby creating a synchronous signal for the detector(s) to monitor. In some cases, this may be a constant pulse frequency. In other cases, it may comprise a predictably varying pulse frequency. In either case, illuminator modulation may be achieved by varying the duty cycle on a spot-by-spot basis.

Still another aspect according to the invention relates to a combination of illuminator brightness variation and pulse-width variation.

In another aspect, illuminator pulsing may be used alone, without illumination intensity modulation, to create a synchronous signal for detection.

Other aspects relate to various detector optical configurations including staring, retro-collective, and confocal.

Another aspect, according to the invention, relates to a scanned beam imager module that may be used in a 2D bar code reading system. By emulating the output of a CCD or CMOS imaging engine, a scanned beam imaging engine may be conveniently substituted into close derivatives of existing designs.

Another aspect relates to using synchronous modulation and detection in adjoining systems to reduce or eliminate crosstalk between such systems.

BRIEF DESCRIPTION OF THE DRAWINGS

FIG. 5b is a chart showing the apparent brightness ranges of objects shown in FIG. 5a.

DETAILED DESCRIPTION OF THE INVENTION

Figure 1:
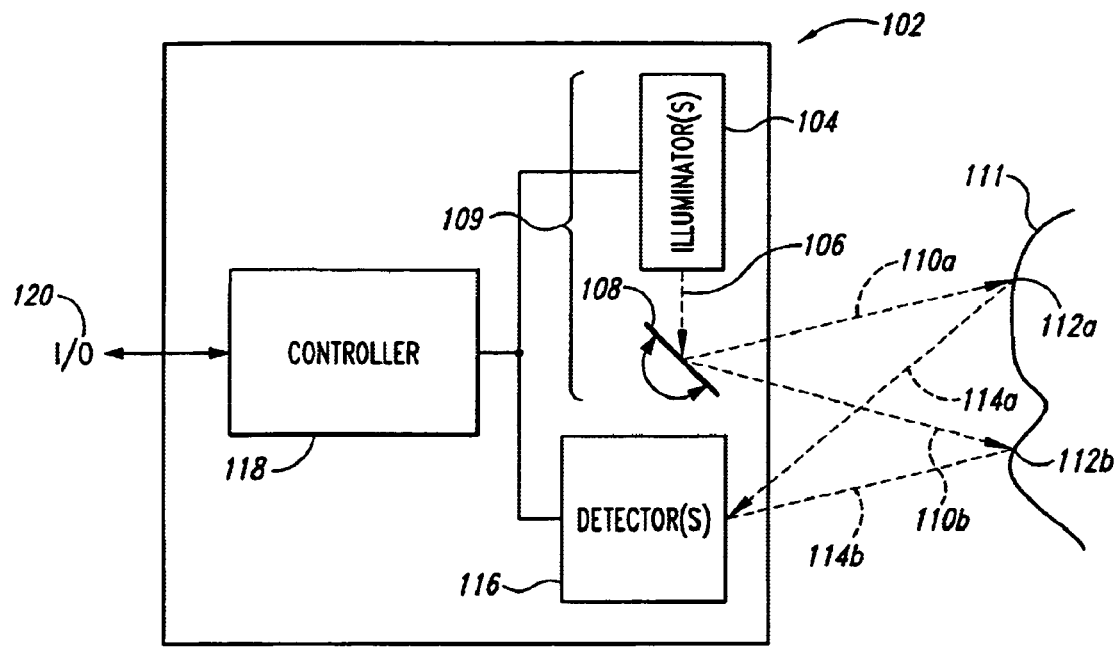
FIG. 1 is a block diagram of a simple scanned beam imager and/or variable illuminator.

FIG. 1 shows a block diagram of a scanned beam imager 102 that comprises one form of a variable illumination system. An illuminator 104 creates a first beam of light 106. A scanner 108 deflects the first beam of light across a field-of-view (FOV) to produce a second scanned beam of light 110. Taken together, the illuminator 104 and scanner 108 comprise a variable illuminator 109. Instantaneous positions of scanned beam of light 110 may be designated as 110a, 110b, etc. The scanned beam of light 110 sequentially illuminates spots 112 in the FOV. Spots 112a and 112b in the FOV are illuminated by the scanned beam 110 at positions 110a and 110b, respectively. While the beam 100 illuminates the spots, a portion of the illuminating light beam 100 is reflected according to the properties of the object or material at the spots to produce scattering or reflecting the light energy. A portion of the scattered light energy travels to one or more detectors 116 that receive the light and produce electrical signals corresponding to the amount of light energy received. The electrical signals drive a controller 118 that builds up a digital representation and transmits it for further processing, decoding, archiving, printing, display, or other treatment or use via interface 120.

The light source 104 may include multiple emitters such as, for instance, light emitting diodes (LEDs), lasers, thermal sources, arc sources, fluorescent sources, gas discharge sources, or other types of illuminators. In a preferred embodiment, illuminator 104 comprises a red laser diode having a wavelength of approximately 635 to 670 nanometers (nm). In another preferred embodiment, illuminator 104 comprises three lasers; a red diode laser, a green diode-pumped solid state (DPSS) laser, and a blue DPSS laser at approximately 635 nm, 532 nm, and 473 nm, respectively. While laser diodes may be directly modulated, DPSS lasers generally require external modulation such as an acousto-optic modulator (AOM) for instance. In the case where an external modulator is used, it is typically considered part of light source 104. Light source 104 may include, in the case of multiple emitters, beam combining optics to combine some or all of the emitters into a single beam. Light source 104 may also include beam-shaping optics such as one or more collimating lenses and/or apertures. Additionally, while the wavelengths descried in the previous embodiments have been in the optically visible range, other wavelengths may be within the scope of the invention.

Light beam 106, while illustrated as a single beam, may comprise a plurality of beams converging on a single scanner 108 or onto separate scanners 108.

Scanner 108 may be formed using many known technologies such as, for instance, a rotating mirrored polygon, a mirror on a voice-coil as is used in miniature bar code scanners such as used in the Symbol Technologies SE 900 scan engine, a mirror affixed to a high speed motor or a mirror on a bimorph beam as described in U.S. Pat. No. 4,387,297 entitled PORTABLE LASER SCANNING SYSTEM AND SCANNING METHODS, an in-line or "axial" gyrating, or "axial" scan element such as is described by U.S. Pat. No. 6,390,370 entitled LIGHT BEAM SCANNING PEN, SCAN MODULE FOR THE DEVICE AND METHOD OF UTILIZATION, a non-powered scanning assembly such as is described in U.S. patent application Ser. No. 10/007,784, SCANNER AND METHOD FOR SWEEPING A BEAM ACROSS A TARGET, commonly assigned herewith, a MEMS scanner, or other type. All of the patents and applications referenced in this paragraph are hereby incorporated by reference A MEMS scanner may be of a type described in U.S. Pat. No. 6,140,979, entitled SCANNED DISPLAY WITH PINCH, TIMING, AND DISTORTION CORRECTION; U.S. Pat. No. 6,245,590, entitled FREQUENCY TUNABLE RESONANT SCANNER AND METHOD OF MAKING; U.S. Pat. No. 6,285,489, entitled FREQUENCY TUNABLE RESONANT SCANNER WITH AUXILIARY ARMS; U.S. Pat. No. 6,331,909, entitled FREQUENCY TUNABLE RESONANT SCANNER; U.S. Pat. No. 6,362,912, entitled SCANNED IMAGING APPARATUS WITH SWITCHED FEEDS; U.S. Pat. No. 6,384,406, entitled ACTIVE TUNING OF A TORSIONAL RESONANT STRUCTURE; U.S. Pat. No. 6,433,907, entitled SCANNED DISPLAY WITH PLURALITY OF SCANNING ASSEMBLIES; U.S. Pat. No. 6,512,622, entitled ACTIVE TUNING OF A TORSIONAL RESONANT STRUCTURE; U.S. Pat. No. 6,515,278, entitled FREQUENCY TUNABLE RESONANT SCANNER AND METHOD OF MAKING; U.S. Pat. No. 6,515,781, entitled SCANNED IMAGING APPARATUS WITH SWITCHED FEEDS; and/or U.S. Pat. No. 6,525,310, entitled FREQUENCY TUNABLE RESONANT SCANNER; for example; all commonly assigned herewith and all hereby incorporated by reference.

Alternatively, illuminator 104, scanner 108, and/or detector 116 may comprise an integrated beam scanning assembly as is described in U.S. Pat. No. 5,714,750, BAR CODE SCANNING AND READING APPARATUS AND DIFFRACTIVE LIGHT COLLECTION DEVICE SUITABLE FOR USE THEREIN which is incorporated herein by reference.

In the case of a 1D scanner, the scanner is driven to scan output beams 110 along a single axis. In the case of a 2D scanned-beam imager, scanner 108 is driven to scan output beams 110 along a plurality of axes so as to sequentially illuminate a 2D FOV 111.

For the case of 2D imaging, a MEMS scanner is often preferred, owing to the high frequency, durability, repeatability, and/or energy efficiency of such devices. A bulk micromachined or surface micro-machined silicon MEMS scanner may be preferred for some applications depending upon the particular performance, environment or configuration. Other embodiments may be preferred for other applications.

A 2D MEMS scanner 108 scans one or more light beams at high speed in a pattern that covers an entire 2D FOV or a selected region of a 2D FOV within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal scan may be driven magnetically or capacitively. Electrostatic driving may include electrostatic plates, comb drives or similar approaches. In various embodiments, both axes may be driven sinusoidally or resonantly.

Several types of detectors may be appropriate, depending upon the application or configuration. For example, in one embodiment, the detector may include a PIN photodiode connected to an amplifier and digitizer. In this configuration, beam position information is retrieved from the scanner or, alternatively, from optical mechanisms, and image resolution is determined by the size and shape of scanning spot 112. In the case of multi-color imaging, the detector 116 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, photodetectors such as PIN photodiodes, APDs, and PMTs may be arranged to stare at the entire FOV, stare at a portion of the FOV, collect light retro-collectively, or collect light confocally, depending upon the application. In some embodiments, the photodetector 116 collects light through filters to eliminate much of the ambient light.

The present device may be embodied as monochrome, as full-color, and even as a hyper-spectral. In some embodiments, it may also be desirable to add color channels between the conventional RGB channels used for many color cameras. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels) or may be applied universally to all channels, for instance as luminance modulation.

Figure 2:
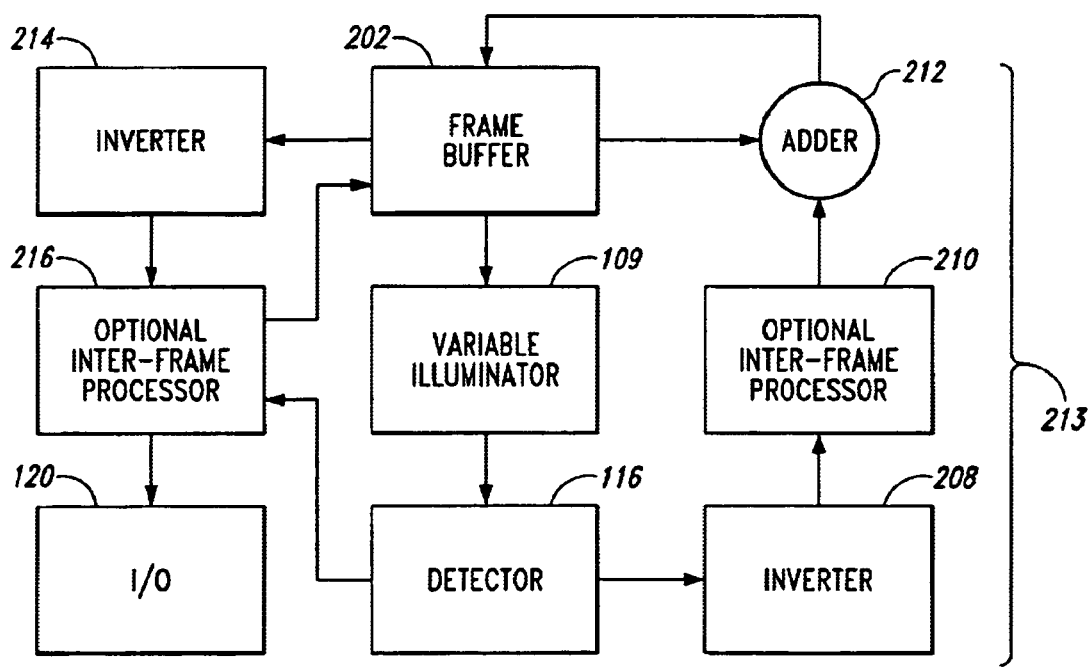
FIG. 2 is a block diagram of an apparatus and method for modifying illuminator power.

FIG. 2 is a block diagram that illustrates one control approach for adjusting variable illuminator intensity. Initially, a drive circuit drives the light source based upon a pattern, which may be embodied as digital data values in a frame buffer 202. The frame buffer 202 drives variable illuminator 109, which may, for instance comprise an illuminator and scanner as in FIG. 1. For each spot or region, the amount of scattered light is detected and converted into an electrical signal by detector 116. Detector 116 may include an A/D converter that outputs the electrical signal as a binary value, for instance. One may refer to this detected value as a residual. The residual is inverted by inverter 208, and is optionally processed by optional intra-frame image processor 210. The inverted residual or processed value is then added to the corresponding value in the frame buffer 202 by adder 212. This proceeds through the entire frame or FOV until all spots have been scanned and their corresponding frame buffer values modified. The process is then repeated for a second frame, a third frame, etc. until all spot residuals have converged. In some embodiments and particularly those represented by FIG. 4a, the pattern in the frame buffer represents the inverse of the real-world image in the FOV at this point, akin to the way a photographic negative represents the inverse of its corresponding real-world image.

Inverter 208, optional intra frame processor 210, and adder 212 comprise leveling circuit 213.

The pattern in the frame buffer 202 is read out and inverted, by inverter 214. The inverted pattern may be subjected to optional inter-frame image processing by optional inter-frame image processor 216 and then output to a display, to storage, to additional processing, etc. by input/output 120.

Optional intra-frame image processor 210 includes line and frame-based processing functions to manipulate and override imager control. For instance, the processor 210 can set feedback gain and offset to adapt numerically dissimilar illuminator controls and detector outputs, can set gain to eliminate or limit diverging tendencies of the system, and can also act to accelerate convergence and extend system sensitivity. These latter aspects will be discussed in more detail elsewhere. To ease understanding, it will be assumed herein that detector and illuminator control values are numerically similar, that is one level of detector grayscale difference is equal to one level of illuminator output difference.

As a result of the convergence of the apparatus of FIG. 2, spots that scatter a small amount of signal back to the detector become illuminated by a relatively high beam power while spots that scatter a large amount of signal back to the detector become illuminated with relatively low beam power. Upon convergence, the overall light energy received at from each spot may be substantially equal.

One cause of differences in apparent brightness is the light absorbance properties of the material being illuminated. Another cause of such differences is variation in distance from the detector. Because of the inherently adaptive nature of the illumination in the present system, greater depth-of-field often results as a natural byproduct. Furthermore, such increased depth-of-field may be realized with systems having lower illuminator output power and lower power consumption than would be possible otherwise. Because the amount of optical power illuminating any one spot or region can be established at a "correct" level, spots are not typically substantially over-illuminated. Compared to other systems that must illuminate all spots sufficiently to capture determinate energy from the darkest spots of interest in the FOV, the present system may output that relatively high amount of illumination energy only to those specific darkest spots of interest, other spots with higher apparent brightness receiving lower illumination energy. Furthermore, illumination output energy is frequently limited by comfort and/or safety requirements. In the case of bar code scanners for instance, laser safety requirements frequently limit output to Class II or lower for general-purpose scanners and Class IIIa or lower for specialized, long-range scanners. Because such safety regulations typically rely on measurements of incident energy integrated over a relatively large spot corresponding to the pupil size of the human eye and over a relatively long period of time, a system that limits illumination energy both spatially and temporally stands to have an advantage in achieving a numerically lower, nominally safer classification. Therefore, in some applications, the present system may achieve greater scan range at a more restrictive safety classification than prior art scanners.

Optional intra-frame image processor 210 and/or optional inter-frame image processor 216 may cooperate to ensure compliance with a desired safety classification or other brightness limits. This may be implemented for instance by system logic or hardware that limits the sum total energy value for any localized group of spots corresponding to a range of pixel illumination values in the frame buffer. Further logic may enable greater illumination power of previously power-limited pixels during subsequent frames. In fact, the system may selectively enable certain pixels to illuminate with greater power (for a limited period of time) than would otherwise be allowable given the safety classification of a device. In this way, the system can probe distant and/or dark regions of the FOV over multiple frames, acquiring grayscale values for such spots without exceeding desired power limits.

Figure 3:
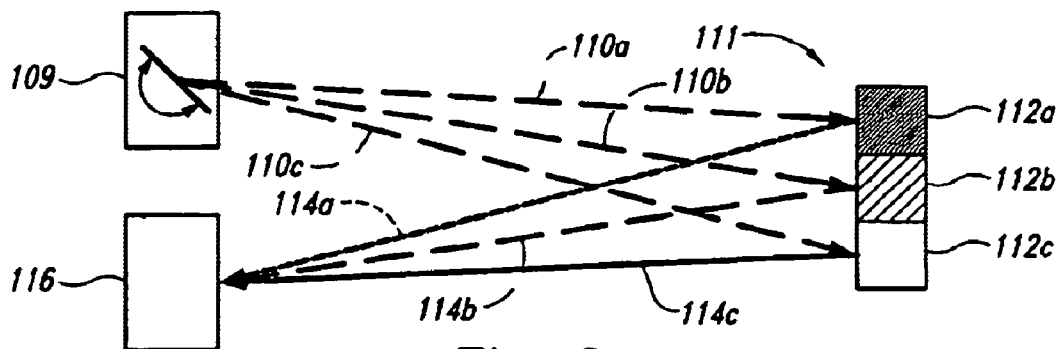
FIG. 3 is a conceptual diagram showing an initial state for an illuminator. In this case, the illumination energy is held constant and the amount of scattered energy received at the detector varies proportionally to the apparent brightness of the spot.

While the components of the apparatus of FIG. 2 are shown as discrete objects, their functions may be split or combined as appropriate for the application: In particular, inverters 208 and 214, intraframe processor 210, adder 212, and interframe processor 216 may be integrated in a number of appropriate configurations The effect of the apparatus of FIG. 2 may be more effectively visualized by referring to FIGS. 3 and 4a-4c. FIG. 3 illustrates a state corresponding to an exemplary initial state of frame buffer 202. A beam of light 110 produced by a variable illuminator 109 is shown in three positions 110a, 110b, and 110c, each illuminating three corresponding spots 112a, 112b, and 112c, respectively. Spot 112a is shown having a relatively low apparent brightness, spot 112b has a medium apparent brightness, and spot 112c has a relatively high apparent brightness, as indicated by the dark gray, medium gray and light gray shading, respectively.

In an initial state corresponding to FIG. 3, the illuminating beam 110 may, for example, be powered at a medium energy at all locations, illustrated by the medium dashed lines impinging upon spots 112a, 112b, and 112c. In this case, dark spot 112a, medium spot 112b, and light spot 112c return low strength scattered signal 114a, medium strength scattered signal 114b, and high strength scattered signal 114c, respectively to detector 116. Low strength scattered signal 114a is indicated by the small dashed line, medium strength scattered signal 114b is indicated by the medium dashed line, and high strength scattered signal 114c is indicated by the solid line.

Figure 4A:
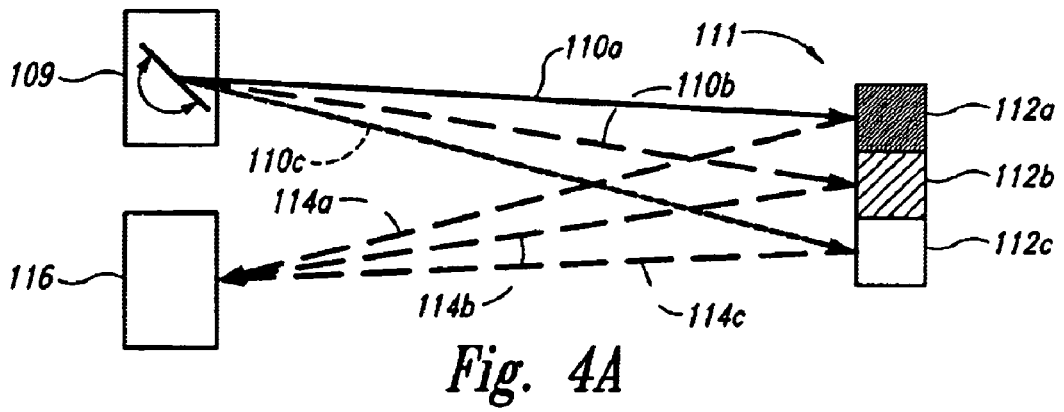
FIG. 4a is a conceptual diagram showing a converged state for an illuminator that has been programmed to provide a flat-field or leveled scatter. In this case, the illumination energy is modified in a manner inversely proportional to the apparent brightness of each spot to result in substantially the same amount of received energy at the detector.

FIG. 4a illustrates a case where the frame buffer 202 has been converged to a flat-field response. After such convergence, light beam 110 produced by variable illuminator 109 is powered at level inverse to the apparent brightness of each spot 112 it impinges upon. In particular, dark spot 112a is illuminated with a relatively powerful illuminating beam 110a, resulting in medium strength scattered signal 114a being returned to detector 116. Medium spot 112b is illuminated with medium power illuminating beam 110b, resulting in medium strength scattered signal 114b being returned to detector 116. Light spot 112c is illuminated with relatively low power illuminating beam 110c, resulting in medium strength scattered signal 114c being returned to detector 116. In the case of FIG. 4a, image information is no longer determined primarily by the strength of the signals being returned to the detector, but rather by the power of the beams used to illuminate the FOV.

Figure 4B:
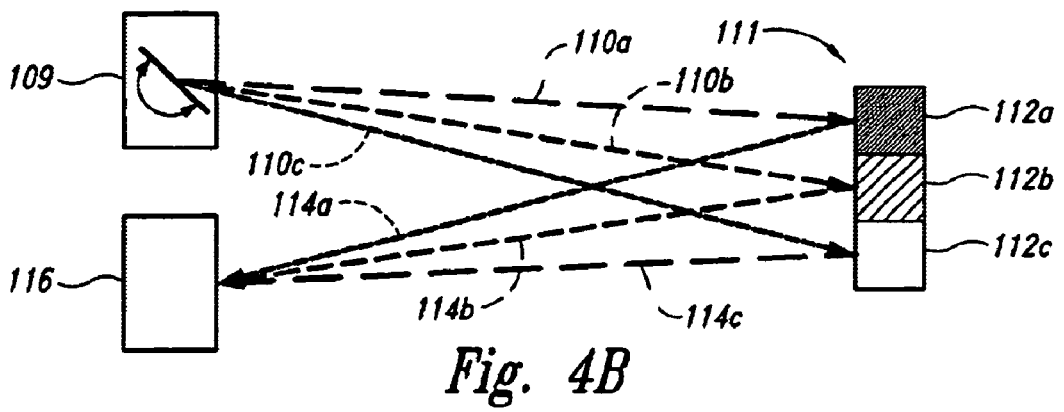
FIG. 4b is a conceptual diagram showing a converged state for an illuminator that has been programmed to compress FOV dynamic range somewhat but still maintain differences in apparent brightness.

It is possible and in some cases preferable not to illuminate the FOV such that all spots return substantially the same energy to the detector. For example, it may be preferable to compress the returned signals somewhat to preserve the relative strengths of the scattered signals, but move them up or down as needed to fall within the dynamic range of detector 116. FIG. 4b illustrates this variant of operation. In this case, the illumination beam 110 is modulated in intensity by variable illuminator 109. Beam position 110a is increased in power somewhat in order to raise the power of scattered signal 114a to fall above the detection floor of detector 116 but still result in scattered signal 114a remaining below the strength of other signals 114b scattered by spots 112b having higher apparent brightness. The detection floor may correspond for example to quantum efficiency limits, photon shot noise limits, electrical noise limits, or other selected limits. Conversely, apparently bright spot 112c is illuminated with the beam at position 110c, decreased in power somewhat in order to lower the power of scattered signal 114c to fall below the detection ceiling of detector 116, but still remain higher in strength than other scattered signals 114b returned from other spots 112b with lower apparent brightness. The detection ceiling of detector 116 may be related for instance to full well capacity for integrating detectors such as CCD or CMOS arrays, non-linear portions of A/D converters associated with non-pixelated detectors such as PIN diodes, or other selected limits set by the designer. Of course, illuminating beam powers corresponding to other spots having scattered signals that do fall within detector limits may be similarly modified in linear or non-linear manners depending upon the requirements of the application. For instance, in some applications, the apparent brightness range of spots may be compressed to fit the dynamic range of the detector, spots far from a mean level receiving a lot of compensation and spots near the mean receiving only a little compensation, thus producing an image with lots of grayscale information. Conversely, in applications where it is desirable to maximize gamma and maximize contrast such as bar code or text reading, it may be desirable to choose illumination energy based on a global or local threshold algorithm that tends to force scattered signal strengths one way or the other toward the low or high limits of the detector.

Figure 4C:
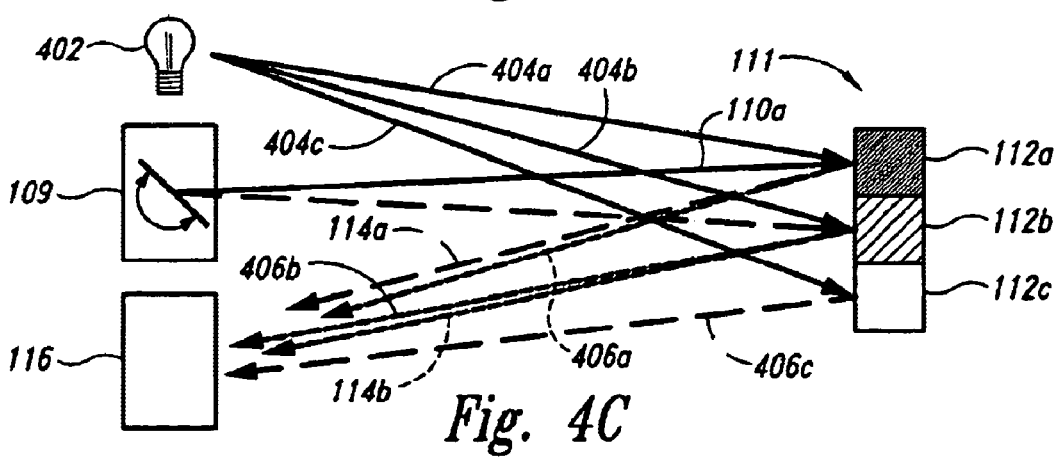
FIG. 4c is a conceptual diagram showing a converged state for a differential illuminator that has been programmed to augment a conventional illuminator to reduce FOV dynamic range

FIG. 4c is a diagram showing a variant of FIG. 4b where the dynamic illumination created by variable illuminator 109 is used to augment static illumination produced by static illuminator 402. In FIG. 4c, static illuminator 402 illuminates spots 112a, 112b, and 112c with some power via light rays 404a, 404b, and 404c, respectively. The power of rays 404 may be a static value, user-adjustable, or may be determined using known exposure techniques for artificially lit or flash photography. While nominally of equal power in this example, rays 404a, 404b, and 404c may be of non-equal power due to system limitations or for purpose. The particular powers of rays 404a, 404b, and 404c are generally not addressable in linearly independent ways. In the present example, it is assumed that the power of static illumination rays 404 has been set to optimize the illumination of the spot with highest apparent brightness, 112c. Accordingly, dark spot 112a returns a low strength scattered signal 406a to detector 116, medium spot 112b returns a medium strength scattered signal 406b to detector 116, and light spot 112c returns a high strength scattered signal 406c to detector 116. In the present example, it is assumed that scattered signal 406a and 406b are too weak to readily distinguish from one another and preserve image detail. That is they fall below or too close to the sensitivity floor of detector 116.

FOV 111 is also illuminated by dynamic illumination from variable illuminator 109. After convergence, beam 110 is powered at a level inverse to the apparent brightness of each spot 112 it strikes, taking into account the illumination power provided by static illuminator 402. In particular, dark spot 112a is illuminated with a relatively powerful illuminating beam 110a, resulting in medium strength scattered signal 114a augmenting low strength signal 406a from static illuminator 402 being returned to detector 116. Medium spot 112b is illuminated with a relatively weak illuminating beam 110b, resulting in medium strength scattered signal 114b being returned to detector 116, augmenting low strength signal 406b. Light spot 112c is not illuminated because signal 406c is of sufficient strength to place the apparent brightness of spot 112c near the upper limit of detector 116 dynamic range.

Figure 5A:
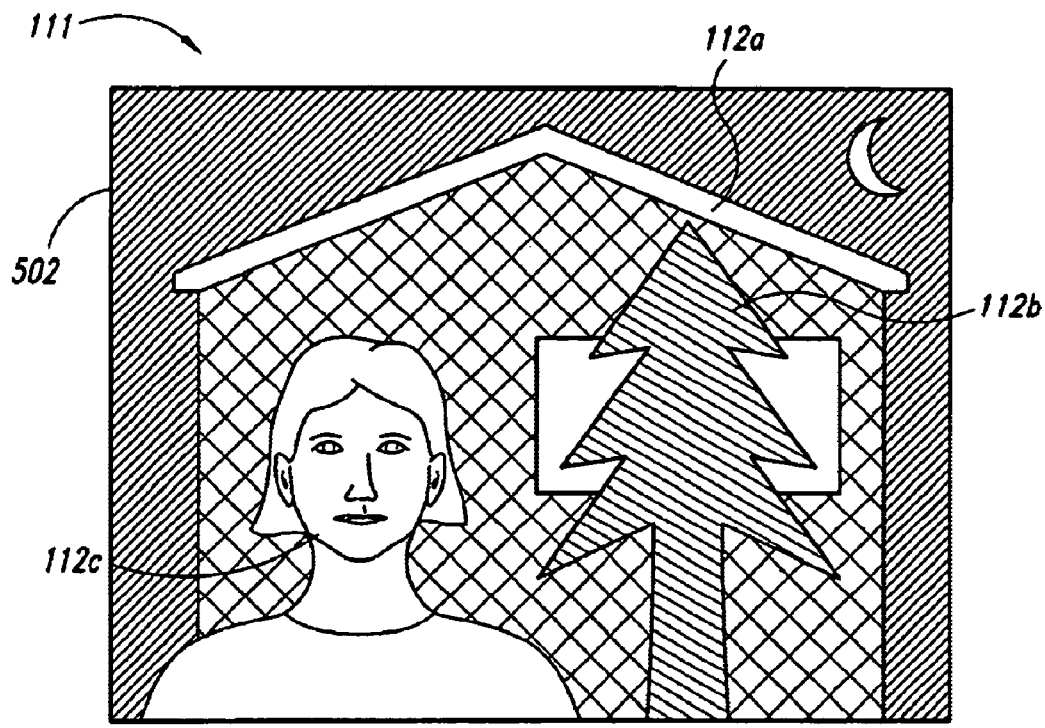
FIG. 5a is an exemplary image showing regions differentially illuminated to reduce FOV dynamic range per the techniques of diagrams 4a, 4b and 4c.
Figure 5B:
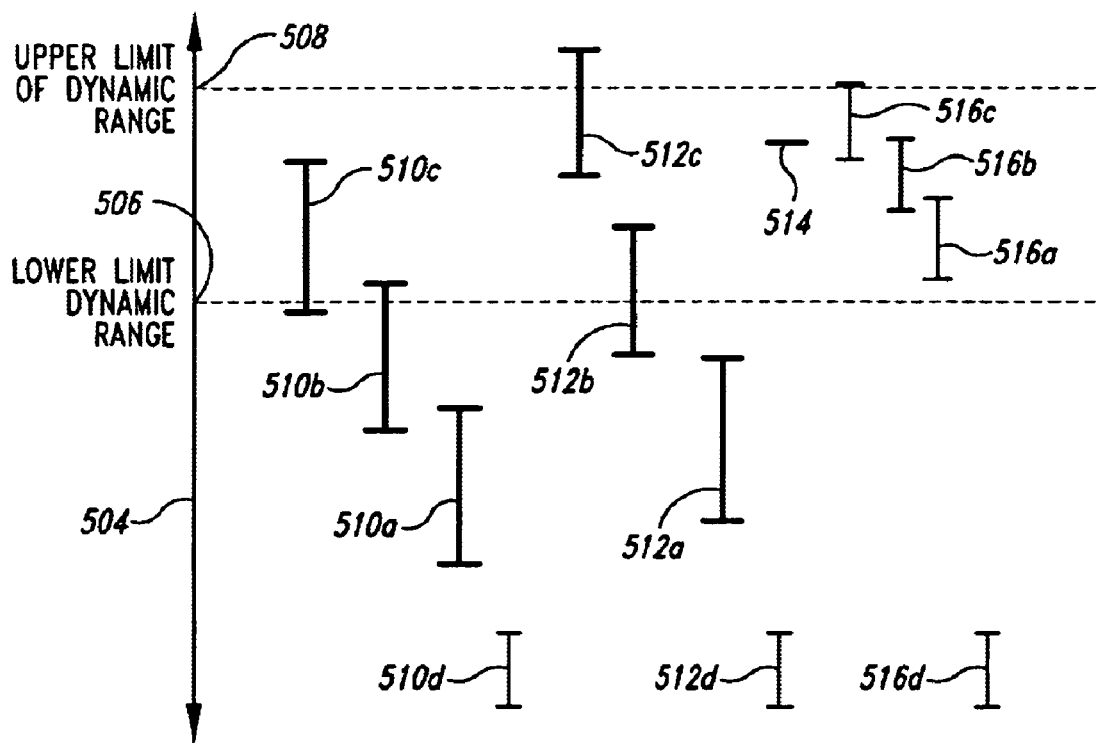

FIGS. 5a and 5b illustrate how scenarios 3 and 4a through 4c might work in a typical real-world scene. Referring to FIG. 5a, an FOV 111 includes a foreground object 112c, a middle ground object 112b, and a background object 112c. Object 112c has a high apparent brightness corresponding roughly to spots 112c in FIGS. 3-4c. This high apparent brightness may be the result of lighter coloration than other objects in the FOV or closer distance than other objects, or both, as in this example case. Similarly, the middle ground object 112b has a somewhat lower apparent brightness while the background object 112a has an apparent brightness that is lower yet. In addition, a far background field 502, has a very low apparent brightness. One noticeable difference between FIGS. 3-4b and FIG. 5a is that while regions or spots 112 in FIGS. 3-4b have little or no difference in apparent brightness within them while spots 112 in FIG. 5a have discernable value differences within them.

Referring to FIG. 5b, brightness ranges for the various spots or regions of FIG. 5a are indicated. Scale 504 indicates apparent brightness of regions 112a-112b and 502, which may be expressed as irradiance (Watts/cm**2), illuminance (lumens) or other selected units. Lower dynamic range limit 506 and upper dynamic range limit 508 define the dynamic range of an arbitrary detector.

Range brackets 510c, 510b, 510a and 510d indicate the apparent brightness of regions 112c, 112b, 112a, and 502, respectively, for FOV 111 with no illumination. As shown in FIG. 5b, while highlights of region 112c are detectable, shadows are lost in darkness. All but the brightest highlights of the middle ground object 112b are undetectable and the background object 112a is lost entirely. Far background 502 is undetectable.

Range brackets 512c, 512b, 512a, and 512d indicate the apparent brightness of regions 112c, 112b, 112a, and 502, respectively, under static illumination. This may correspond, for instance, to prior art flash photography. Note the typical feature of many flash photographs where the dynamic range 512c of the foreground object 112c is "washed out" with its highlights exceeding the dynamic range maximum of the detector. The middle ground object 112b is illuminated with substantially the same power as the foreground object but because of its greater distance does not increase in apparent brightness as much as the foreground object and thus remains largely in the shadows. The background object 112a receives even less illumination because of its still greater distance and remains undetectable. Far background 502 remains undetectable.

Bar 514 indicates an idealized depiction of a scene illuminated as in FIG. 4a. Upon convergence, all parts of the FOV, with the exception of far background 502, are illuminated inversely to their apparent brightness, resulting in all spots scattering the same light back to the detector. Because of the very great range and lack of backscatter from far background 502, it does not rise in brightness in any substantial way. In this case, image information is retained by the illuminator frame buffer, consistent with the resolution of the scanned spot.

It may be noted that the vertical position of bar 514 is coincident with or slightly above the upper limit of the brightest spot in the FOV to be imaged, in this case the brightest highlight of the foreground object 112c corresponding to the upper end of range 510c. This ensures all spots in the FOV have determinate values and thus may be assigned grayscale values. In other applications, it may be preferable to leave certain highlights indeterminate. This may be especially true in the case of a substantially bimodal image such as a bar code symbol. In this case, it may be desirable to set the maximum illuminator power at or near the edge threshold of the bars for instance, leaving the white background indeterminate and effectively filtering out any noise therein. Other examples of when it may be desirable to leave certain bright spots indeterminate include when illuminator power is simply not sufficient to overcome their ambient brightness.

Ranges 516c, 516b, 516a, and 516d correspond to regions 112c, 112b, 112a, and 502, respectively for cases corresponding to FIGS. 4b and 4c. In the case of 4b, the foreground object region 112c receives a small amount of illumination, enough to raise its dynamic range 516c to a level appropriate for it and other scene content. This may be chosen by moving the brightest pixel close to the ceiling of the photodetector, which may for instance correspond to the full well capacity of a CCD detector array, or it may be chosen according to other programmed modes akin to programmed modes used in digital and film cameras. The middle ground object 112b is illuminated moderately to raise its dynamic range from range 510b to 516b and the background object 112a is illuminated significantly to raise its dynamic range from 510a to 516a. In this example, all regions that can be illuminated, i.e. all regions except region 502, have been dynamically illuminated sufficiently to bring them into the dynamic range of the detector while maintaining significant contrast within that dynamic range.

For the case corresponding to FIG. 4c, the entire FOV has been illuminated by a static illuminator in an amount appropriate to brighten the foreground object 112c to a desired level. A dynamic illuminator may optionally illuminate darker regions of the foreground object to compress its darker regions toward its highlights. The dynamic illuminator has added moderate illumination power to the middle ground object 112b and rather significant illumination power to the background region 112a to raise the dynamic ranges of those regions to correspond to ranges 516b and 516a, respectively.

For this example, the mode logic may have been used to determined it optimum to compress all three regions to fit within the dynamic range of the detector. For this example, logic has selected lower static illumination power to keep the foreground object highlights in dynamic range. This was partially enabled by the fact that the differential illuminator would sufficiently illuminate the middle ground and background objects, thus reducing the need to over expose the foreground object in the interest of retaining some background detail.

For the cases corresponding to both FIGS. 4b and 4c, the far background 502 has remained substantially unchanged, having dynamic range 516d. In some embodiments, these pixels may be synthetically loaded according to scene content, user preference, prior or later image capture, etc.

Figure 6A:
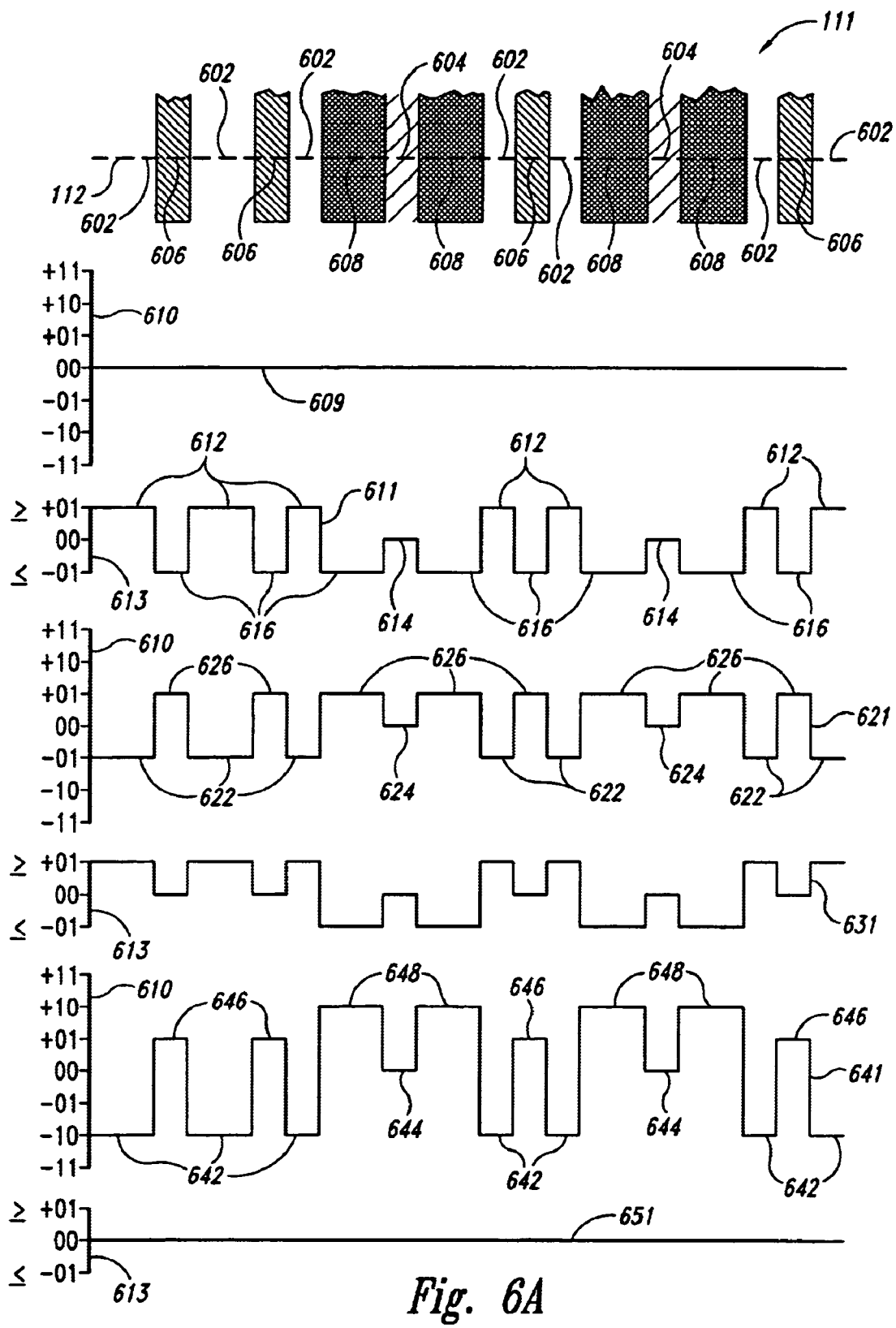
FIG. 6a is a diagram showing waveforms for converging illuminator power per the method of FIG. 4a over several frames for an exemplary 1D FOV.

FIG. 6a is an example of how reflectance values for several spots along a linear scan path might be converged to a substantially constant reflectance value with grayscale values being retained as the inverse of the illumination beam power profile for the scan path. A FOV 111 comprises a scan path 112 having a plurality of spots. The plurality of spots in scan path 112 correspond to several apparent brightness levels including white spots 602, light gray spots 604, medium gray spots 606 and black spots 608. Shown below FOV 111 are several vertically aligned waveforms. Waveform 610 illustrates the illuminator power corresponding to scan path 112. In this example, the illuminator power is held constant for the first scan at a level of 00 out of a possible 7 binary values ranging from −11 to +11.

Waveform 611 is an idealized response from a detector having dynamic range limited to three states: 00 (nominal), ≧+01, and ≦−01. It ignores optical effects such as Gaussian distortion and assumes gain equivalent to illuminator gain— i.e. ±01 Detector units correspond to ±01 illuminator units. In waveform 611, a 00 strength beam swamps the detector when scattered from white spots 602. This is seen by detector values 612 at the high rail (≧+01) in locations corresponding to white spots 602. Conversely, a 00 strength beam reflected from medium gray spots 606 and from black spots 608 results in an undetectable response of ≦−01 in waveform locations 616 corresponding to spots 606 and 608. Light gray spots 604 scatter a medium energy signal corresponding to 00 detector response levels 614.

In accordance with the process of FIG. 2, detector waveform 611 is inverted and added to illuminator waveform 609 to produce new illuminator waveform 621. Because initial illuminator waveform 609 was constant, illuminator waveform 621 is simply the inverse of detector waveform 611, with low −01 power regions 622 corresponding to high detected energy regions 612, medium 00 power regions 624 corresponding to medium detected energy regions 614, and high +01 power regions 626 corresponding to low detected energy regions 616.

Beam 112 is then scanned across FOV 111 again using illuminator power waveform 621 which may, for instance, be implemented in the form of a frame buffer. Detector waveform 631 results from the second pass of beam 112. This time, medium gray spots 606 have joined light gray spots 604 in falling within the dynamic range of the detector, but there are still spots that fall outside the range of the detector. Detector waveform 631 is inverted and added to previous illuminator waveform 621 to produce third pass illuminator waveform 641 comprising power levels 642 of −10 corresponding to white spots 112, levels 644 of 00 corresponding to light gray spots 604, levels 646 of +01 corresponding to medium gray spots 606, and levels 648 of +11 corresponding to black spots 608. Beam 112 is finally scanned across FOV 111 using illuminator power waveform 641. Resulting detector power waveform 651 is constant and within the dynamic range 613 of the detector, indicating complete convergence. Thus the inverse of illuminator power waveform 641 has become an image of linear scan path 112 across FOV 111. Consequently, by comparing spots against scale 610, we can see that white spots 602 have a grayscale value of +10, light gray spots 604 have a grayscale value of 00, medium gray spots 606 have a grayscale value of −01, and black spots 608 have a grayscale value of −10.

As can be seen, the system can record an image having a dynamic range greater than that of the detector. In the example of FIG. 6a, the image was determined to have a grayscale range of 5 levels (−10 to +10) whereas the detector had only one determinate grayscale level.

Figure 6B:
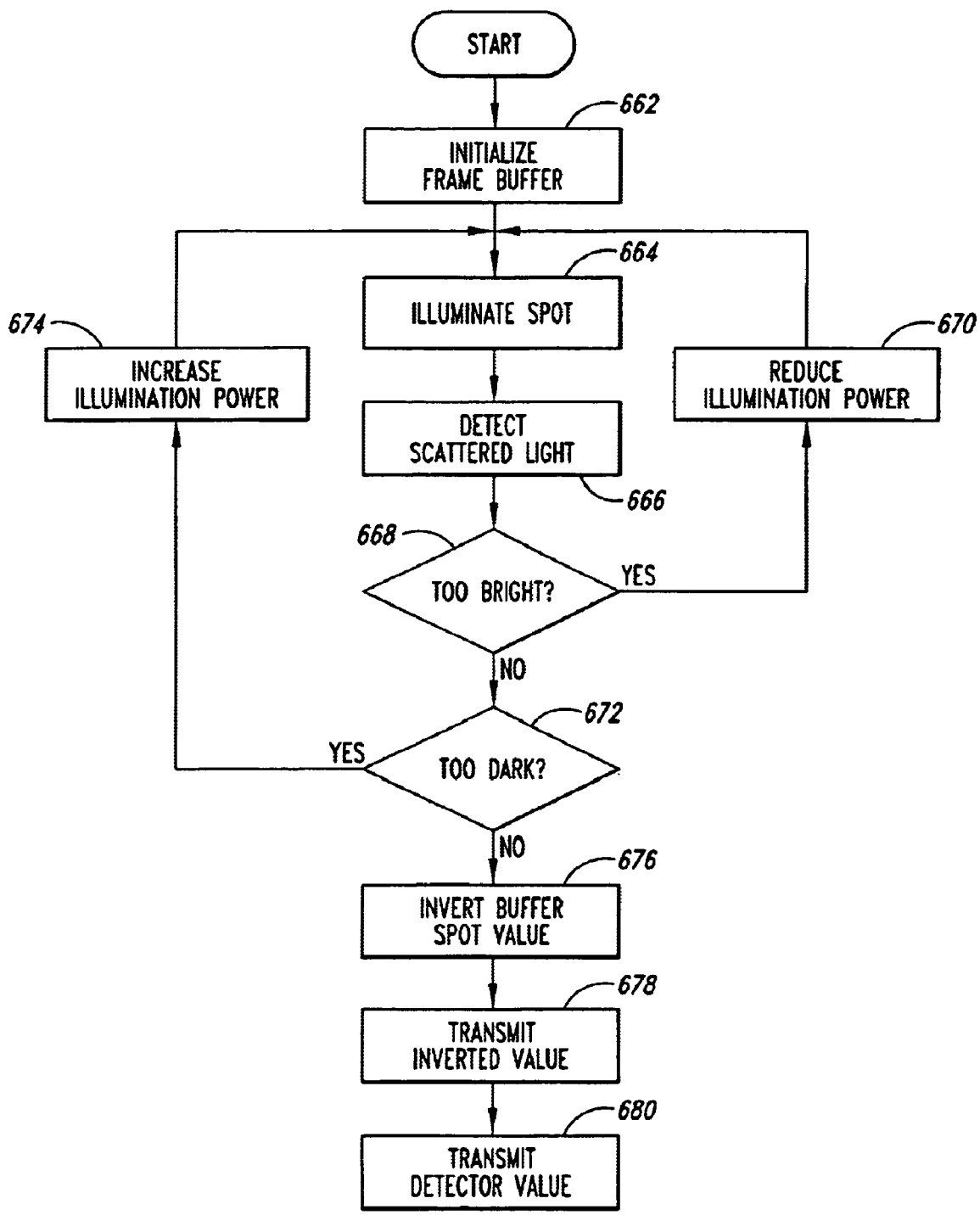
FIG. 6b is a flow chart showing another explanation of how a pixel value is converged.

The flowchart of FIG. 6b shows logic for an embodiment of illuminator power adjustment. In step 662, the frame buffer is initialized. In some embodiments, the buffer values may be set to fixed initial values near the middle, lower end, or upper end of the power range. Alternatively, the buffer may be set to a quasi-random pattern designed to test a range of values. In yet other embodiments, the buffer values may be informed by previous pixels in the current frame, some approaches being described in FIGS. 8 and 9. In still other embodiments, the buffer values may be informed by previous frames or previous images.

Using the initial frame buffer value, a spot is illuminated and its scattered light detected as per steps 664 and 666, respectively. If the detected signal is too strong per decision step 668, illumination power is reduced per step 670 and the process repeated starting with steps 664 and 666. If the detected signal is not too strong, it is tested to see if it is too low per step 672. If it is too low, illuminator power is adjusted upward per step 674 and the process repeated starting with steps 664 and 666.

Thresholds for steps 668 and 672 may be set in many ways. For detectors that are integrating, such as a CCD detector for instance, the lower threshold may be set at noise equivalent power (NEP) (corresponding to photon shot noise or electronic shot noise, for example) and the upper threshold set at full well capacity. Instantaneous detectors such as photodiodes may be limited by non-linear response at the upper end and limited by NEP at the lower end. Thus these points may be used as thresholds for step 668 and step 672, respectively. Alternatively, upper and lower thresholds may be programmable depending upon image attributes, application, user preferences, illumination power range, electrical power saving mode, etc.

Additionally, upper and lower thresholds used by steps 668 and 672 may be variable across the FOV. For instance, when the apparatus is used as a dynamic range compressor as illustrated by FIGS. 4b, 4c, 5a, and 5b, illuminator energy for a given spot may be selected according to the range of illumination energies and/or detected scatter from the range of relevant spots across the FOV. For instance, whereas a medium gray spot 112b may require only a little illumination power to raise its scatter or reflectance up above the minimum level required for detection in the absence of additional, darker spots; the presence of additional darker spots 112a may dictate a somewhat higher step 672 minimum threshold for that spot in order to raise its apparent brightness high enough in the detector dynamic range to make room for additional, darker spots to also fall within that dynamic range. This is illustrated in the relative positions of ranges 516b and 516a, respectively in FIG. 5b.

As described above, the process of FIG. 6b may be used to achieve determinateness, that is, illuminate many or all pixels at levels sufficient to fall within the range of the detector. In other embodiments, the levels used in steps 668 and 672 may be set at a single value, such as the midpoint of detector sensitivity for example. This could be used to achieve complete convergence.

After a scattered signal has been received that falls into the allowable detector range, the detector value may be inverted per optional step 676 and transmitted for further processing, storage, or display in optional step 678. Steps 676 and 678 are identified as generally optional depending upon the application.

For applications involving scanned beam imaging and when the illuminator power itself contains a significant portion of pixel information, pixel illuminator power (or the inverted value of pixel illuminator power) may be transmitted. On the other hand, when the range between upper and lower thresholds is large (for steps 668 and 672, respectively), illuminator power may be used essentially to compensate for relatively large-scale differences across the FOV, with most pixel information being retained in the detector value. This may be used, for instance, when illuminator power modulation is used to compensate for overall FOV reflectivity, range, transmissivity, or other effect that modifies the signal in a gross sense. For some applications, most or all of the useful image information may then be determined by the detector and illuminator power omitted from further processing.

In yet another type of application, illuminator power may be used to define other programmable parameters during further processing. In some applications, high illuminator power may indicate greater imaging range. For the case of a bar code or other decodable indicia imager for instance, illuminator power may thus be used to set a band pass frequency for image decoding. In this case, higher power implies longer range, longer range implies a smaller apparent mean feature size (owing to the multiplicative effect of scan angle with distance), and a smaller apparent mean feature size means the decoder should be looking for smaller, higher frequency features when performing a decode. When the illuminator power is used in this way, signal inversion step 676 is optional.

In addition to or, as illustrated above, instead of transmitting illuminator power for further operations, the detector value may be transmitted as in optional step 680. For the case of a bar code or other decodable indicia imager as described immediately above, the detector may contain most or all of the important image information for decode. In other applications and particularly those where the detector dynamic range is very limited, there may be very little effective image information in the detector value resulting from the selected illuminator power and transmission of the detector value may be omitted.

In still other applications significant useful portions of the image data may be present in both the illuminator power and the detector value. An example of this type of application is an endoscope where illuminator power is used to extend the working range of the device and most of the image information is present in the detector value, but a few bits of apparent pixel brightness information retained by illuminator power act as the most significant bits of the pixel value.

In other applications, and particularly those corresponding to FIGS. 4b and 4c, illumination power and resultant detected light may not be transmitted at all, the apparatus having achieved its goal simply by appropriately illuminating the FOV. This type of operation may be especially useful when the illuminator is used as a "flash apparatus" or to augment a flash apparatus for array imaging technologies such as digital or film photography.

As will be explained later, several aspects of the methods illustrated by foregoing FIGS. 2 through 6b do not necessarily require a scanned beam to selectively illuminate, but rather may use other forms of selective illuminators such as an illuminator array or illumination attenuator array, for example.

Two possible side effects of the system described herein are losses in temporal or spatial resolution. That is, during the time spent converging the image, any movement in the image relative to the scanner can necessitate the need to re-converge (increasing latency) and/or can result in indeterminate spot values (effectively decreasing spatial resolution) corresponding to edges having high contrast relative to detector dynamic range. One approach to overcome this issue is to increase frame rate and/or spatial resolution sufficiently to make any indeterminate spots so fleeting or small as to render them insignificant. This approach may be used to special advantage in some cases with linear CCD/CMOS imagers or linear laser scanners, either of which can deliver refresh rates up to several hundred or even several thousand frames per second at high effective resolution. Another technique may be understood by referring back to FIG. 2, where optional intra-frame image processor 210 and optional inter-frame image processor 216 may cooperate to speed convergence.

As indicated above, optional intra-frame image processor 210 includes line and frame-based processing functions to manipulate and override imager control and can accelerate convergence and extend system sensitivity. Specifically, to control source power levels, optional intra-frame image processor 210 may load grayscale values into the frame buffer to override values that would normally be loaded by inverted residual addition. The intra-frame image processor 210 can also load values to other pixels in the frame buffer beyond the currently processed pixel.

Figure 7:
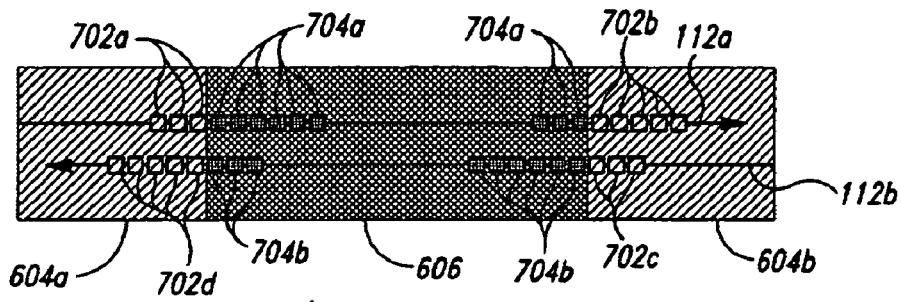
FIG. 7 is a diagram indicating a non-converged state for two exemplary beam scans across a 2D FOV.
Figure 8:
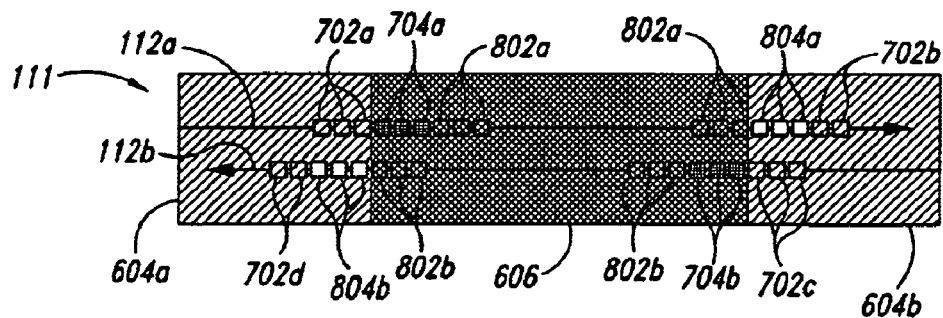
FIG. 8 is a diagram indicating partial intra-frame convergence for the two beam scans of FIG. 7 achieved by using image processing.
Figure 9:
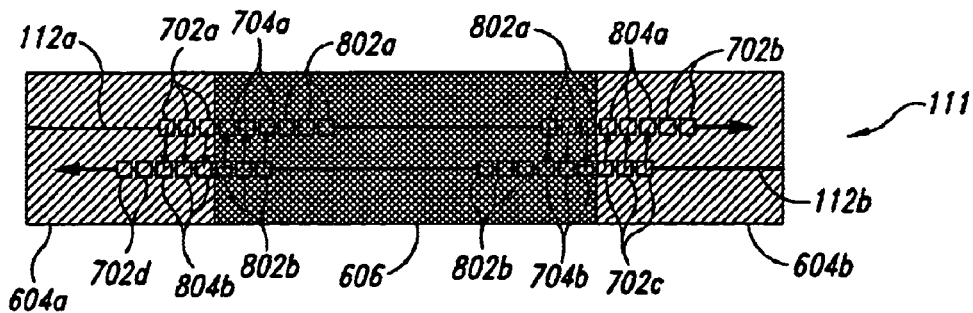
FIG. 9 is a diagram indicating a pseudo-converged state for the two beam scans of FIGS. 7 and 8 achieved intra-frame using further image processing.

FIGS. 7, 8, and 9 illustrate methods used by optional intra-frame image processor 210 and optional inter-frame image processor 216 to increase the rate or decrease the time for convergence with FIG. 7 showing operation corresponding to one frame of the process of FIG. 6a. FIG. 7 shows two neighboring scan lines 112a and 112b across 2D FOV 111. In this example, scan line 112a is a left-to-right scan line while scan line 112b is a right-to-left scan line. FOV 111 comprises three regions; a medium gray region 606 abutted on each edge by light gray regions 604a and 604b across which scan lines 112a and 112b pass. Superimposed over the scan lines are individual pixels 702 and 704. Only a few of the pixels are shown for clarity. The areas of interest for this discussion are the few pixels in each scan line corresponding to the transitions from light gray to medium gray and back again. The shading of the pixels indicates the calculated or indeterminate gray values determined by the scanned beam imager. For this discussion, it is assumed that illuminator power for scan lines 112a and 112b is initially set at constant value 609.

Comparing FIG. 7 to FIG. 6a, pixels 702a, 702b, 702c, and 702d corresponding to light gray regions 604 are determinate on the first pass as were gray level 00 regions in FIG. 6a. Thus, pixels 702 are illustrated as light gray equal to the actual gray level of the corresponding FOV spots. As scan line 112a proceeds from left to right across the transition from region 604a to region 606, pixels 704a corresponding to the right side of the edge are illustrated as black. This indicates their value to be indeterminate. That is, the detector receives a signal below its minimum sensitivity or floor so it is indeterminate if the actual gray level of region 606 is a little darker than the minimum level the detector will detect or much darker. Proceeding farther along the scan line, all pixels corresponding to spots in region 606 are indeterminate during the current frame (although, per FIG. 6a, the illumination power would be reduced for those spots on the subsequent frame and pixels 704a would then become determinate). As the scan line 112a crosses the edge from region 606 to region 604b, it again receives enough optical energy for the signal to be within the range of the detector, and thus pixels 702b are determinate and are shown shaded light gray in correspondence with the shading of spots within region 604b. The situation is repeated on subsequent right-to-left scan line 112b, with pixels corresponding to regions 604a and 604b being determinate and pixels corresponding to region 606 indeterminate (dark).

FIG. 8 illustrates a technique for achieving faster convergence for some spots. The technique of FIG. 8 results in some indeterminate (dark) pixels becoming determinate prior to the subsequent frame. A side effect is that it may create some other indeterminate (light) pixels. The particular signs, light vs. dark, of the additional indeterminate pixels are not significant for this example as they are functions of the particular example of FIG. 8. As in FIG. 7, scan line 112a produces determinate light gray pixels 702a corresponding to spots in region 604a. As before, pixel values become indeterminate pixels 704a after crossing the edge from region 604a to region 606. This time, however, an adaptive illuminator power is used to regain determinism while the scan path is still within region 606. After one or more pixel values become indeterminate (dark), illuminator power is increased until detected energy again rises above the lower limit of the detector, thus producing determinate medium gray pixels 802a. As the scan line crosses the edge from region 606 to 604b, subsequent pixels 804a are indeterminate (light). This may be caused by the illuminator power being set at a level appropriate to darker region 606, resulting in excess signal from lighter region 604b swamping the detector. In a manner analogous to what happened after the scan path crossed the edge from region 604a to 606, illuminator power is decreased until reflected energy is again within the dynamic range of the detector, resulting in determinate light gray pixels 702b. This process is repeated during subsequent scan 112b.

From inspection of FIG. 8, it can be seen that three indeterminate pixels were produced after an edge of excessive dynamic range was crossed. Thus, in this example, the logic of optional intra-frame image processor 210 required three successive indeterminate (dark) or indeterminate (light) pixels be acquired before resetting the illumination power higher or lower, respectively. Setting a relatively large number of indeterminate pixel acquisitions of the same sign prior to illuminator power adjustment may be useful when detector dynamic range is small relative to FOV dynamic range and/or when relatively high frequency, small features relative to imager addressability are present in the FOV, for example. This can reduce any tendency for the acceleration process to induce instability. A smaller number of indeterminate pixel acquisitions may be more appropriate when features are larger or when the dynamic range of the detector is greater. A further refinement automatically sets the gain of the convergence accelerator based upon observed and/or historical FOV attributes such as apparent feature size distribution and apparent dynamic range.

The illuminator power adjustment step size may be a function of detector dynamic range and the convergence algorithm. For instance, it may be preferable for the initial illuminator adjustment to be no greater than the dynamic range of the detector. Alternatively, it may be advantageous to take larger steps to speed intra-frame convergence. Numerous search algorithms are known and may be applied.

For the case where detector dynamic range is relatively large compared to the apparent dynamic range of the FOV, it may be advantageous to dynamically adjust the illuminator power to keep the scattered signal centered within the dynamic range of the detector. This can increase the system's immunity to loss of convergence when crossing edges.

As an alternative to selecting an initial illuminator power to a constant value, an initial power pattern, for instance embodied as a bitmap in a frame buffer, having variable output may be employed. Especially when detector dynamic range is very limited this may help to speed convergence in scenes having generally large features. This may be thought of as a pre-loaded search algorithm comprising illuminator power diversification.

FIG. 9 illustrates a method for accelerating convergence that overcomes the side effect of the additional indeterminate (light) pixels 804a and 804b of FIG. 8. The technique of FIG. 9 makes use of a characteristic of many images that neighboring spots within given regions tend to have similar grayscale values. In particular, spots along one side of an edge tend to have grayscale values similar to neighboring spots along the same side of the edge. Along the opposite side of the edge, the converse is true. Therefore, it is reasonable to use the determinate light gray value of pixels 702a as reasonable guesses of the indeterminate values of pixels 804b. Similarly, grayscale values of pixels 802b may be substituted for indeterminate values of pixels 704a, determinate values of pixels 802a for indeterminate pixels 704b, and determinate values of pixels 702c for indeterminate pixels 804a. FIG. 9 illustrates this approach as arrows pointing from determinate pixels to their associated indeterminate pixels. This procedure may be carried out after scans 112a and 112b to fill in unknown values and create a pseudo-converged image to be verified during the subsequent frame. A similar procedure may also be carried out a priori, using the illumination map of one scan line as the starting point for the illumination map of the subsequent line. Over a period of lines, edges begin to emerge, further informing the image processor(s) of likely values for yet-to-be-scanned pixels in the frame. Edge finding and other applicable algorithms are known to those having skill in the art of image processing and may be applied as is advisable for the application.

Referring back to the FIG. 2 discussion of probing dark and/or distant spots in conjunction with the foregoing discussion of FIG. 9, a way to improve convergence time of such distant spots may be seen. Because surrounding pixels have a reasonable probability of similar gray values, the system can determine a reasonable initial set of pixel values for rapid convergence by applying probe bursts sparsely across a region, and selecting intervening pixel values by interpolation between determinate values. Over a period of several frames, the system may eventually probe all pixels in dark regions to provide complete FOV grayscale information not otherwise obtainable. To prevent overexposure to laser light, the rule set and burst approach is defined with care.

Optional inter-frame image processor 216 performs frame-based image processing and may be used to inform the system of edge tracking and probing functions, as well as converting the frame buffer values to values appropriate for display or further processing. Optional inter-frame image processor 216 may include image de-skewing to compensate for a moving FOV, white balance compensation, gamma correction including grayscale expansion, compression, or shifting, gamut correction including gamut expansion, compression, or shifting), pixel interpolation, suppression of non-valid pixel values, noise reduction, and combining frame buffer and detector data.

Some of the optional inter-frame image processor 216 functions are based upon edge finding and tracking techniques such as gradient or Sobel operators for edge finding and local maximum/minimum feature extraction for tracking. These and other techniques for edge finding and local maximum/minimum feature extraction are known to those having skill in the art of image processing. Also, as optional intra-frame image processor 210 operates, it may leave indeterminate values in the frame buffer. Optional inter-frame image processor 216 can "scrub" these from the output by tracking which pixels are indeterminate and optionally combining this data with other FOV information.

When several edges have identical movement vectors, optional inter-frame image processor 216 can infer overall FOV movement relative to the system and calculate resulting skew and perform de-skewing algorithms. This can be especially useful in automated systems such as bar code readers and machine vision systems.

White balance processing can compensate for differences in source efficiency or power as well as differences in detector efficiency. Stored calibration values make this process fairly straightforward. To simulate ambient illumination effects, optional inter-frame image processor 216 may shift values to an effective illumination color temperature.

Optional inter-frame image processor 216 may reduce noise using noise correlation principles to distinguish between variations in frame buffer data related to structure in the scene and noise artifacts, and can apply a smoothing function to "clean up" the image. Techniques for doing this are known to the art.

The foregoing has illustrated methods and apparatus for variable FOV illumination using inter- and intra-frame convergence. Another alternative exists in the form of post-processing pixel selection. By this alternative means, a digital imager may capture 2 or more frames of a FOV, each at a different static illumination energy and/or different detector sensitivity. Subsequently, pixels are selected and extracted from the frames to create a resultant combined frame having extended effective dynamic range. To do this, brighter pixel values may be extracted from lower power illumination and darker pixel values extracted from higher power illumination, for instance. For cases where illumination powers or detector sensitivities are known, relative illumination power or relative sensitivity, respectively, may be used to determine combined pixel values. In other cases, differences in the apparent brightness from frame to frame of given pixels may be used to determine combined pixel values, using the assumption that a particular pixel or the mean of a group of pixels has a constant absolute reflectance or scattering coefficient, apparent differences then being used to calculate relative illumination powers or detector sensitivities.

Figure 10:
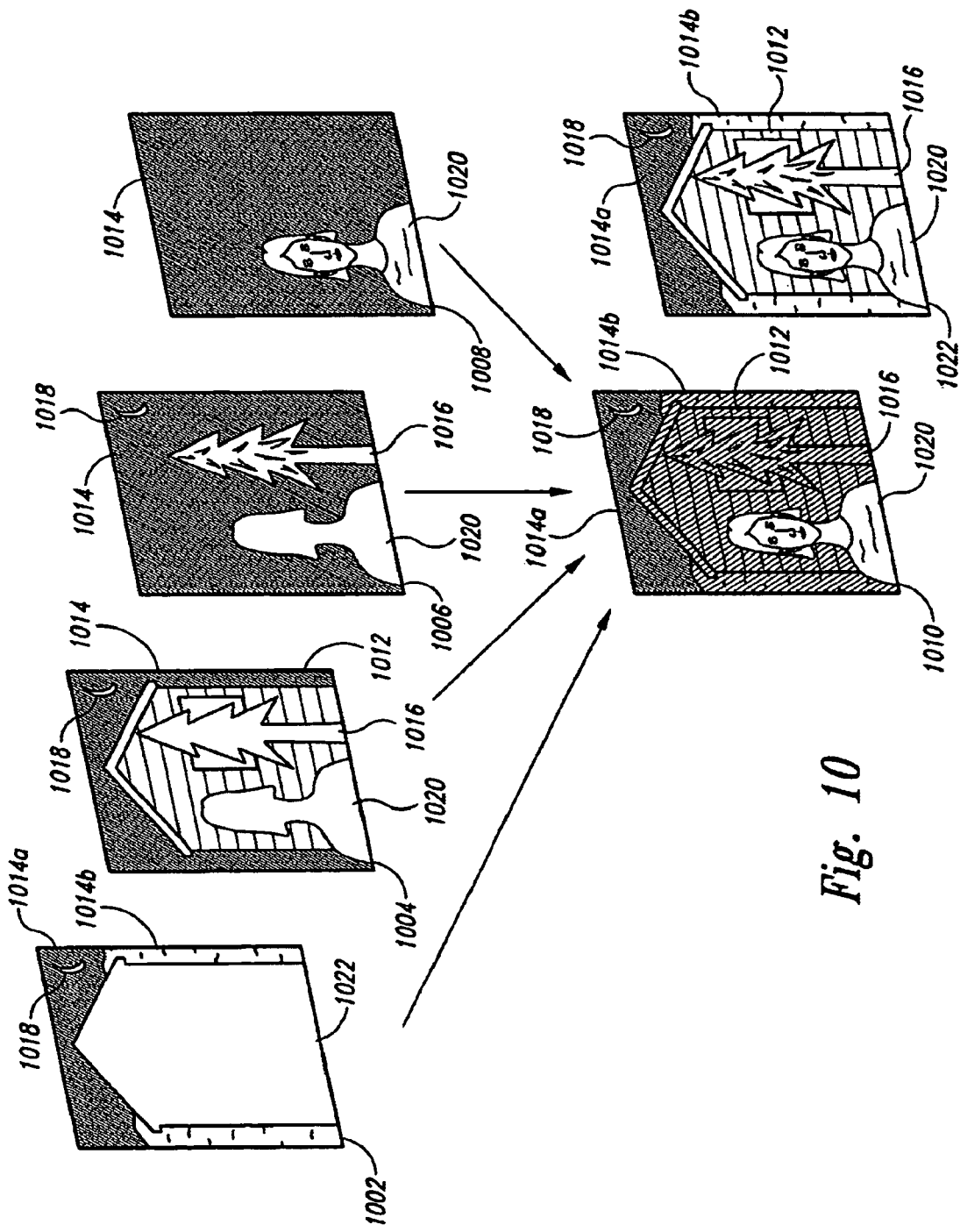
FIG. 10 is a diagram illustrating a post-processing method of combining several complete images, each with a limited dynamic range, into a final image.

FIG. 10 is a diagram illustrating a post-processing method of combining several complete images 1002, 1004, 1006, and 1008, each with a limited dynamic range, into a final image 1010 having greater dynamic range. Image 1004 is captured using a high static illumination energy and thus captures relatively dark region (or spot) 1012, which may for instance comprise a house in the background. Around the house is dark region 1014, which does not have a high enough scattering coefficient to return a usable signal to the detector. Also within image 1004 are three overexposed regions 1016, 1018, and 1020, each of which returned a signal above the upper limit of the detector dynamic range.

Image 1002 is captured using very high static illumination energy that reveals regions 1014a and 1014b within dark region 1014. In this image, dark region 1014b returns sufficient signal to reveal details that may for instance be surrounding landscape while very dark region 1014a remains below the detection threshold. The very high static illumination used to produce image 1002 has now overexposed region 1012 to produce combined overexposed region 1022 (which consists of regions 1012, 1016, and 1020).

Image 1006 is captured using medium static illumination energy and results in proper exposure of medium region 1016. Dark region 1014 now encompasses region 1012 as well. Depending upon the method of varying the apparent static illumination energy, image 1006 may also capture region 1018 with proper exposure. In addition to or as an alternative to changing the actual amount of illumination energy, the apparent illumination energy may also be varied by changing the light sensitivity of the detector, for instance by changing the effective shutter speed, changing the effective aperture, adding a filter over the detector, or changing the intrinsic response for instance by varying electrical bias or amplification. The methods described herein are also applicable to that technique.

Finally, image 1008 is captured using low static illumination energy, thus capturing region 1020 with proper exposure. All other features have faded into dark region 1014.

After, or in parallel to, capture of images 1002, 1004, 1006, and 1008, appropriately exposed regions from each may be combined to produce resultant image 1010. In this image, regions 1020, 1016 (and 1018), 1012, 1014b, and 1014a are shown as progressively darker. That is, the apparent brightness of each has been shifted to account for the differences in static illumination energy between the frames in which they were captured, thus producing a resultant image 1010 with greater dynamic range than any of the source images 1002-1008. Such a large dynamic range image may be compressed to meet the dynamic range limitations of an output device such as a display, printer, or image processor using known techniques.

Other applications may work better if the relative brightness of each of the frames is not shifted when combining, but rather the resultant image is comprised of regions each having substantially the same dynamic range. Alternative resultant image 1022 illustrates this mode where each of the regions 1014b, 1012, 1016 (and 1018), and 1020, captured in frames 1002, 1004, 1006, and 1008, respectively, is combined without shifting. Thus, the apparent dynamic range of image 1022 is no greater than any of its constituents, but regions are included that have different actual apparent brightness that exceed the dynamic range of the image. One example where this mode may be preferable is in indicia imaging such as bar code scanning.

Frames 1002 through 1008 may be captured sequentially or in parallel. When capturing sequentially, a relatively high frame rate is preferable to eliminate relative movement of regions between frames. Additionally or alternatively, image processing software may track the movement of regions between frames to build a resultant frame free of undesirable artifacts.

Figure 11:
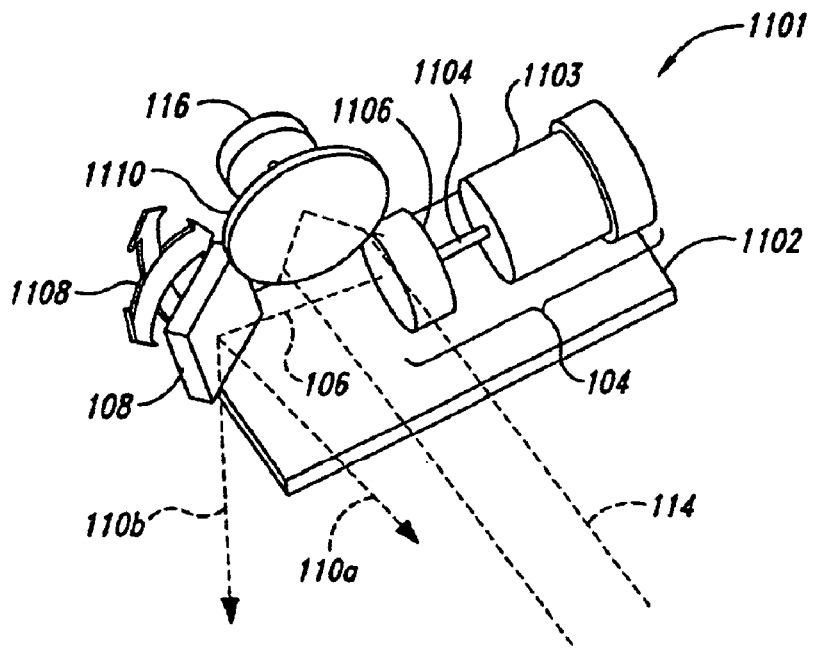
FIG. 11 is an isometric view of a scanned beam imaging engine or variable illuminator.

FIGS. 11-16 are isometric views of alternative imaging engines or variable illuminators. FIG. 11 shows a scanned beam imager or variable illuminator having a single non-pixelated detector 1101. Chassis 1102 carries illuminator assembly 104. Illuminator assembly 104 comprises an emitter 1103 that emits raw beam 1104. Emitter 1103 may be a laser diode and in a preferred embodiment, a monochrome laser diode with peak emission at approximately 635 to 650 nm. Raw beam 1104 is shaped by beam optics 1106, which may for instance comprise a collimating lens and an aperture, to produce first beam 106. First beam 106 is reflected by scanning mirror 108, here shown as deflecting beam is 106 in two axes, as indicated by rotation angles 1108, to produce two dimensionally scanned beam 110. Two positions of scanned beam 110 are shown as beam 110a and 110b. Reflected or scattered beam 114 is collected by optional collection optic 1110, which focuses scattered beam 114 onto detector 116, here shown as a photodiode.

Return beam 114 is shown as having width. This is indicative of the gathering effect of optional collection optic 1110, which serves to increase the subtended angle over which the scattered light may be collected, increasing the numerical aperture and therefore the intensity of the collected signal. It may thus be seen that detector 116 is non-imaging in this embodiment. That is, detector 116 is a staring detector that simply collects all light scattered from the FOV. To improve the signal-to-noise ratio (SNR), it may be advantageous for collection optic 1110 to include a filter to exclude wavelengths not scanned, fluoresced, or otherwise indicative of FOV response to scanned beam 110.

As an alternative or in addition to a staring detector 116, scanned beam imager or variable illuminator 1101 may use confocal or retro-collective collection of return beam 114. Confocal and retro-collective collection schemas de-scan the return signal with the scanning mirror or a synchronized scanning mirror, thus using spatial filtering to ensure the return signal is dominated as much as possible by the scanning spot. Confocal systems detect through an aperture that is arranged confocally to the beam source, thus detecting over a reduced DOF for maximum resolution. Retro-collective systems collect light from around and on the scanning spot, resulting in a balance between maximum signal isolation and maximum DOF. Scanner 108 may alternatively be driven in a single axis for 1D imaging such as a linear bar code scanner for instance. Scanner 108 may alternatively be driven in three axes or more for 3D imaging etc.

Figure 12:
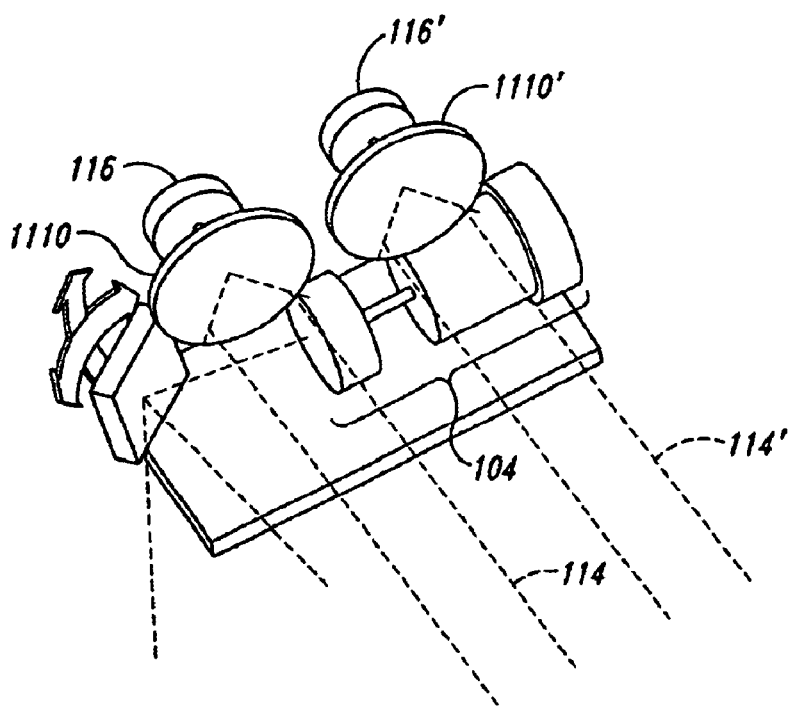
FIG. 12 is an isometric view of a scanned beam imaging engine or variable illuminator having multiple detectors.

FIG. 12 shows a scanned beam imager or variable illuminator having multiple non-pixelated detectors 116 and 116' with associated optional collection optics 1110 and 1110', respectively. Optional collection optic 1110 instantaneously gathers reflected beam 114 and focuses it onto detector 116 while optional collection optic 1110' instantaneously gathers reflected beam 114' and focuses it onto detector 116'. FIG. 12 is one example of a scanned beam imager or variable illuminator having multiple detectors wherein the embodiment includes two detectors 116 and 116'. Other embodiments may include three, four, or more detectors 116, 116', 116", 116''', etc.

The scanned beam imager or variable illuminator of FIG. 12 may have one or more of several operative modes. In one mode, detector 116' may be selected or driven to have a different gain than detector 116, making detector 116' less sensitive than detector 116. In this case, detector 116 may have sufficient dynamic range to capture an entire signal for an FOV with high apparent brightness, for instance a bar code symbol at a relatively close distance such as 2 inches to 5 inches. Conversely, detector 116' may have sufficient dynamic range to capture an entire signal for an FOV with low apparent brightness, such as a bar code symbol at a relatively long distance such as 5 inches to 12 inches for instance. In other applications where the dynamic range of each detector is less than that necessary to capture the entire dynamic range of an image, the detectors 116 and 116' may be used in tandem, each capturing a portion of the dynamic range, wherein their respective captured pixels may be combined as per the method of FIG. 10 to produce an entire output image 1010 or 1022. Thus the apparatus pictured in FIG. 12 may collect frames in parallel without any modulation of variable illuminator output, relying instead on differing gains to produce a multiplicity of images for selection of appropriate dynamic range.

In other applications, detectors 116 and 116' may have overlapping dynamic ranges and may be used in tandem to drive illuminator modulation to an optimum output level. In this approach, the two detectors five ranges of detection; a first no return signal range (indeterminate low) not detectable by either detector, a second low return signal range detectable only by sensitive detector 116, a third medium return signal range detectable by both detectors 116 and 116', a fourth high return signal range detectable by low sensitivity detector 116' and swamping high sensitivity detector 116, and a fifth very high return signal range that is indeterminate high because it swamps both detector 116 and detector 116'. Spots scattering or reflecting an illumination beam in the first or second range would be increased in illumination power according to which range they fell in, spots returning a signal in the fourth or fifth range would be decreased in illumination power according to which range they fell in, and spots returning a signal in the third, medium range, would be considered substantially converged and would retain their illumination power.

Taken to one limit, the second, third, and fourth dynamic ranges could represent very small differences corresponding to the least significant bit, and thus illuminator power selection would represent almost all of the image information.

In another embodiment, the magnitudes of the second, third, and fourth ranges could be varied, for instance with the third range smaller than the other two to help better drive the illuminator to convergence while maintaining reasonable overall dynamic range for rapid convergence. In this case a relatively significant portion of overall dynamic range could be comprehended by ranges two, three, and four.

In another embodiment, the range sizes could be quite large, allowing operation with little or no beam power modulation. In this mode, most of the image information would be determined by detector responses.

In another mode, the apparatus of FIG. 12 could have substantially identical detectors 116 and 116', but have differences in collection optics 1110 and 1110'. For instance, collection optic 1110' could include a filter to reduce signal strength, thus attenuating the response of detector 116'. Alternatively, collection optics 1116 and 1110' could have different collecting powers, for instance by being different sizes, collection optic 1110 being formed to have a higher numerical aperture than collection optic 1110'. This approach would have a similar effect to filtering collection optic 1110', resulting in detector 116 having higher effective sensitivity than detector 116'. This mode could be operated according to the alternatives described for modifying detector sensitivities.

Additionally, detectors 116 and 116' may be selectively additive. This may be done electrically according to known methods. Overall detection sensitivity may thus be varied linearly according to the number of detectors in the array. For the case where effective detector sensitivities are weighted, detectors may be combined in selected combinations to create a broader number of sensitivity ranges. For instance, if the relative sensitivities of four detectors 116''', 116", 116', and 116 is 1,2,4, and 7, respectively; any relative sensitivity ranging from 1 to 14 may be selected. In this case, selection of detector 116''' alone would result in a relative sensitivity of 1, selection of detector 116" would result in a relative sensitivity of 2, selection of detectors 116''' and 116" would result in an additive relative sensitivity of 3, etc. up to selection of all four detectors resulting in an additive sensitivity of 14. Thus, many sensitivity ranges may be synthesized from a relatively small number of detectors. Such sensitivity ranges may be used to positive effect using methods and apparatuses described elsewhere.

In yet another mode, collection optic 1110' may include a filter making it insensitive to the emission wavelength or wavelengths of illuminator 104. In this case, detector 116' may be used to sense ambient light. Knowledge of the ambient light level may be used for instance to select the power output range of illuminator 104 and/or the sensitivity range of detector (or detector array) 116. Thus, the optimal convergence power may be selected to achieve a desired SNR for instance.

In another mode, collection optics 1110, 1110', 1110", etc.; detectors 116, 116', 116", etc., or both may be filtered to select response to a narrowed wavelength range. For instance, three detectors may each be filtered to detect red, green, and blue, respectively, for the purpose of imaging or variably illuminating a FOV in RGB color. To enable this case, illuminator 104 may be selected to create broad band substantially white illumination or a tri-chromic (or higher) narrow band spectrum such as combined laser emission spectra corresponding to the filter functions of each of the RGB detectors 116, 116', and 116". Additionally or alternatively, detectors may be tuned to fluorescence or other shifted spectral response created for instance by fluorescing down converting or quantum well up-converting materials in the FOV.

In another mode, collection optics 1110, 1110', etc. may be aimed to enhance collective sensitivity across the FOV. For instance with a linear bar code scanner, collection optic 1110 may be aimed to primarily collect light returned from the right side of the FOV and collection optic 1110' aimed to primarily collect light returned from the left side of the FOV. Frames may then be combined, converged, etc. to effectively extend the FOV beyond that normally achievable by normal collection optics.

Figure 13:
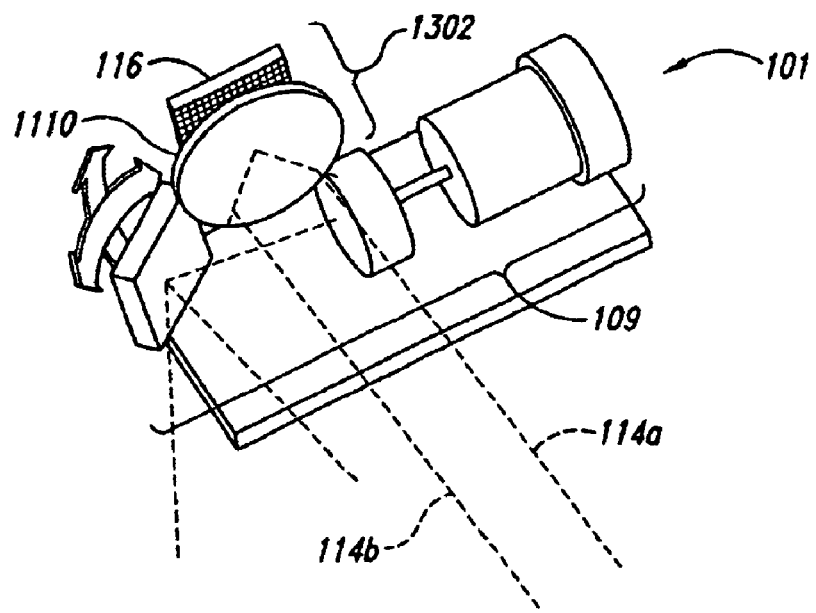
FIG. 13 is an isometric view of a scanned beam imaging engine or variable illuminator having a pixelated detector.

FIG. 13 shows a beam scanner having a pixelated detector 116 to collect returned signals 114 through optional collection optic 1110. Reflected signals 114a and 114b are shown having limited width to draw attention to the imaging nature of pixelated detector 116. Compared to the non-pixelated staring detectors of FIGS. 11 and 12, the pixels in pixelated detector 116 each detect a conjugate location or spot in the FOV.

Figure 20:
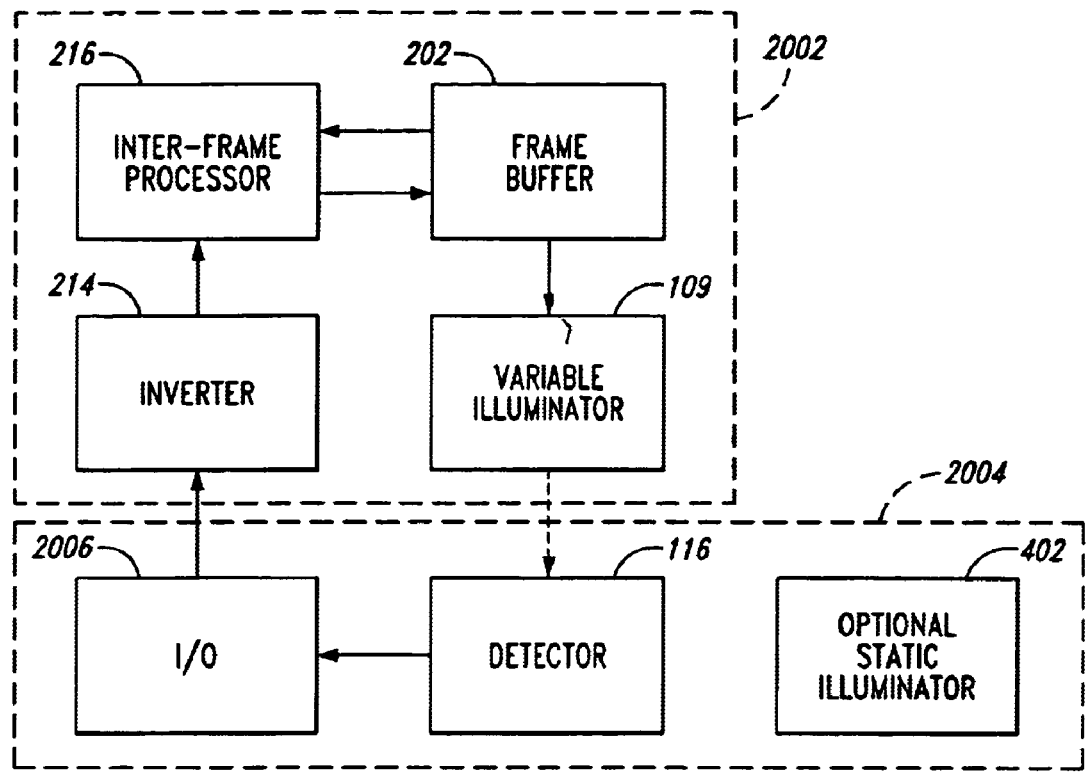
FIG. 20 is a block diagram of a variable illuminator module connected to an imager module.
Figure 21:
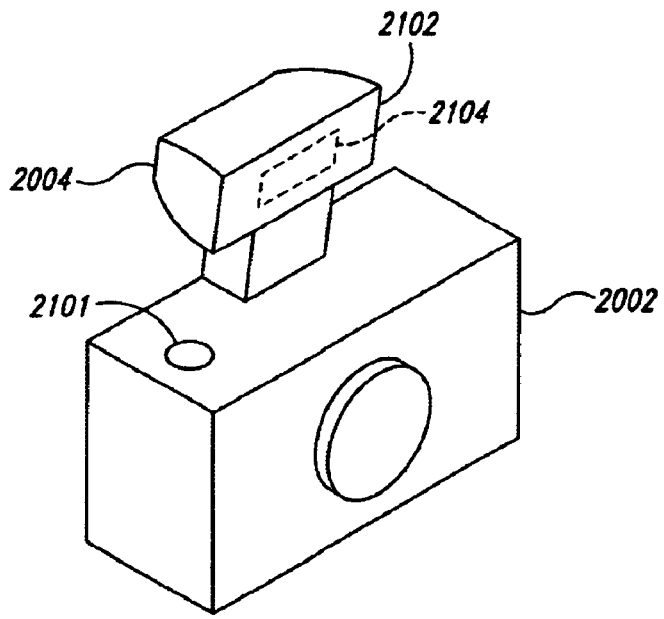
FIG. 21 is an isometric view of a camera with a variable illuminator attached.

Pixelated detector 116 may comprise a CCD, CMOS, or other array device. Pixelated detector 116 and optional collection optic 1110 are shown integrated into scan engine 101. Alternatively, pixelated detector 116 and optional collection optic 1110 may comprise a second body 1302, for instance a digital camera that is logically coupled to variable illuminator 109. In this case the image detected by the digital camera is fed back in its native or in an inverted form to a controller controlling variable illuminator 109 to update the illumination pattern as shown by the apparatus of FIG. 2 and elsewhere in this document. This arrangement of separate bodies is also shown in FIGS. 20 and 21.

Figure 14:
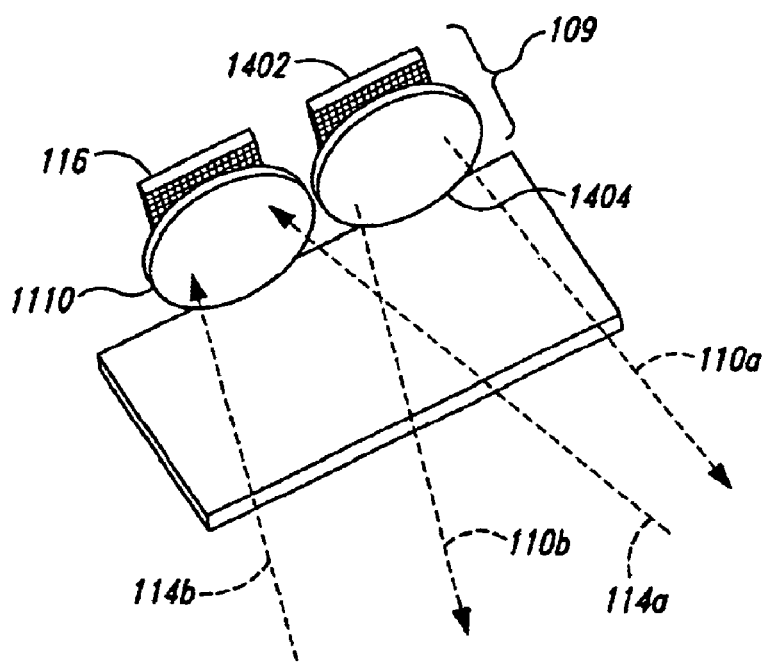
FIG. 14 is an isometric view of an imaging engine or variable illuminator having a non-scanning illuminator array and a pixelated detector.

FIG. 14 shows an imaging engine having a non-scanning multiple beam source and a pixelated detector. Light source 1402 and optional lens 1404 collectively form variable illuminator 109. Light source 1402 emits a plurality of beams 110, here shown as to exemplary beams 110a and 110b, onto the FOV. Scattered rays 114a and 114b are returned from the spots illuminated by beams 110a and 110b, respectively. The scattered rays are collected by collection optic 1110 and focused onto detector array 116. The apparatus is operated as indicated elsewhere.

Variable light source 1402 may comprise for instance an array of individual emitters such as an LED array, a VCSEL array, an array of incandescent sources, an array of gas discharge sources, an array of fluorescent sources, or other emitter array technology as may be appropriate. Illumination beams 110 may have a one-to-one correspondence with scattered beams 114. Alternatively, each illumination beam 110 may correspond to several scattered beams 114. The former being operative to select the apparent brightness of individual pixels and the latter being operative to select regional illumination as may be determined appropriate by a logical combination of the apparent brightness detected by the individual cells in the detector array. In still another embodiment, illumination beams 110 may be overlapping such that at least some of scattered beams 114 are responsive to the power of two or more neighboring illumination beams 110. As in FIG. 13, pixelated detector 116 and optional collection optic 1110 may be formed in a body separate from variable illuminator 109.

Figure 15:
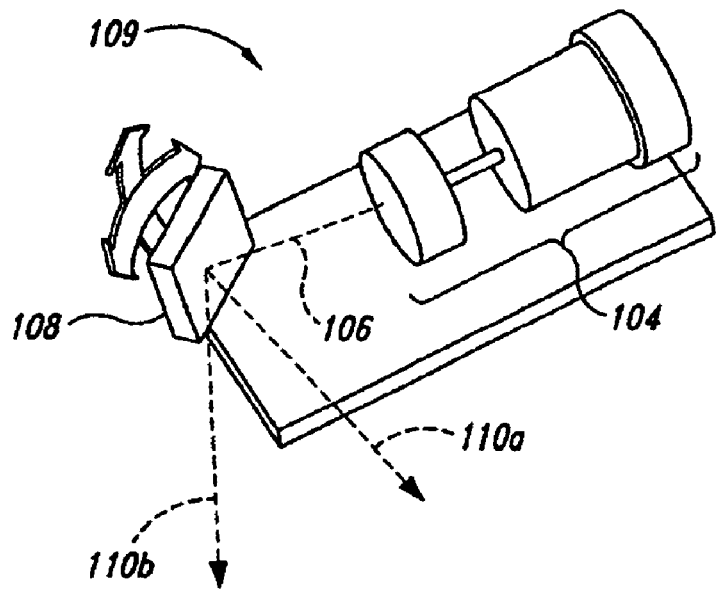
FIG. 15 is an isometric view of a scanned beam variable illuminator.

FIG. 15 shows a scanned beam variable illuminator 109. This would correspond to the case described for FIG. 13 wherein the detection system 1302 is removed to a separate body.

Figure 16:
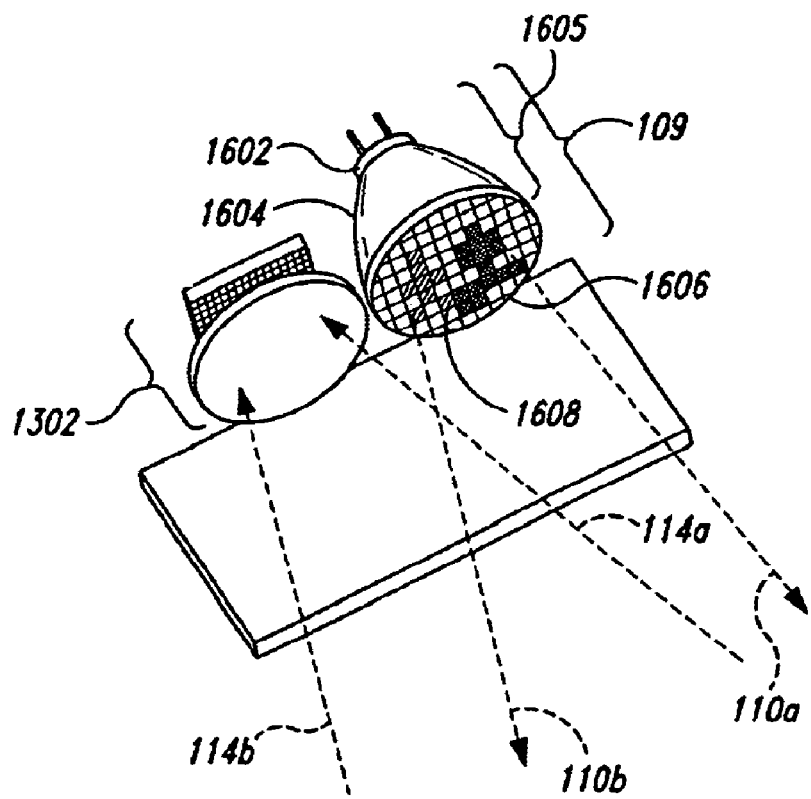
FIG. 16 is an isometric view of an imaging engine or variable illuminator having a static illuminator with variable attenuator and a pixelated detector.

FIG. 16 shows an imaging engine having a variable illuminator 109 comprising non-scanning light source with a variable attenuator. In this case, variable illuminator 109 is analogous to variable illuminator 109 shown in FIG. 14. Rather than independently generating illumination beams 110 as in FIG. 14, a non-variable light source such as a flood or spot illuminator creates relatively broad area of illumination that is selectively attenuated by variable attenuator 1606. In the example of FIG. 16, non-variable light source 1605 is comprised of one or more emitters 1602 and optional reflector 1604 for directing the illumination in the direction of the FOV. One or more emitters 1602 may comprise for instance an incandescent bulb, a non-modulated scanning beam such as a scanning laser beam, an LED array, a xenon or other gas-discharge flash system, a gas discharge constant output source, a fluorescent source, or other illumination source as may be convenient and appropriate. The illumination created by non-variable light source 1605 is selectively passed by the attenuation cells 1608 of attenuator array 1606. Attenuator array 1606 may comprise for instance a transmissive liquid crystal array, a thermo-optic or electro-optic array, a mechanical shutter array, or other means for selectively transmitting light. As an alternative to transmissive attenuation, variable illuminator 109 may be constructed to provide variable reflected illumination. In this case attenuator array 1606 may for instance comprise a liquid crystal on silicon (LCOS) array, a deformable mirror array, or other means for variably reflecting light. As in FIG. 14, variable illuminator 109 may emit illumination beams 110 that have one-to-one or many-to-one correspondence to scattered beams 114.

Figure 17:
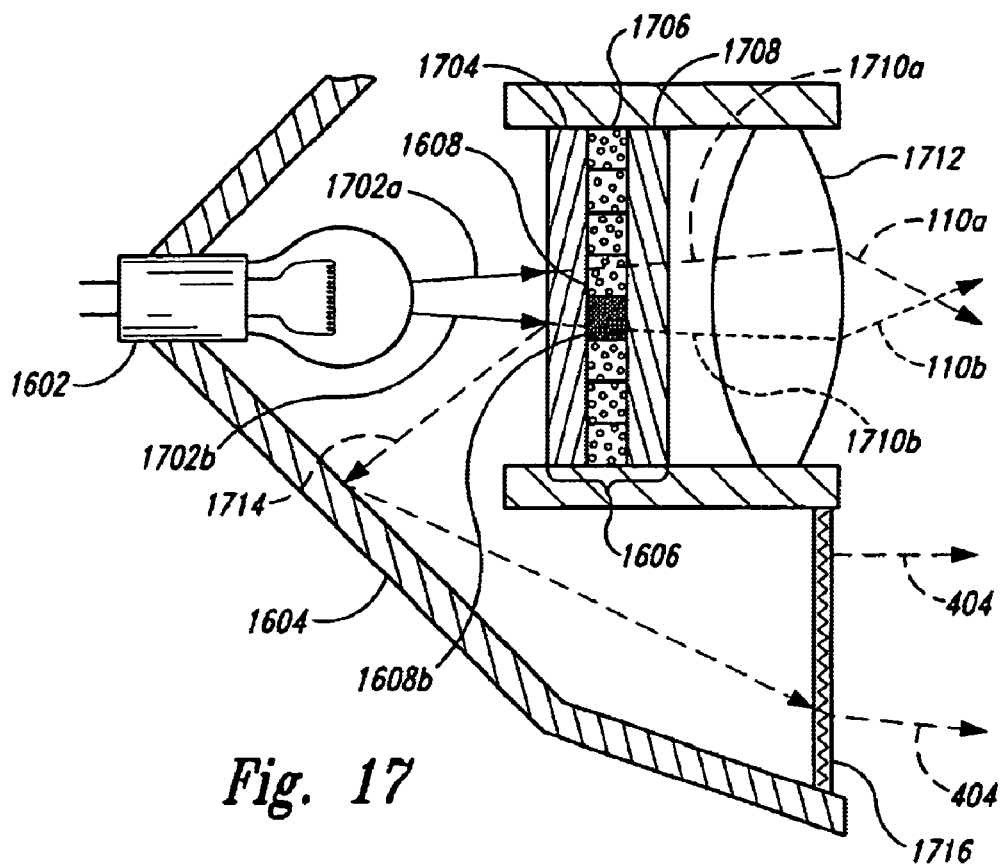
FIG. 17 is a side sectional view of a combination static and variable illuminator where variable illumination is produced by a variable attenuator.

FIG. 17 is a cross-sectional view of an illuminator that combines variable illumination with non-variable illumination. The example of FIG. 17 uses a transmissive attenuator to control the variable power portion of the illuminator. Emitter 1602 emits first non-variable rays 1702. Non-variable rays 1702 are non-variable in the sense that they are not directly controlled to control spot-by-spot, spatially variable illumination. Non-variable rays 1702 are, of course, controllable in terms of illumination duration and/or overall power output.

The example of FIG. 17 includes a transmissive liquid crystal-based variable attenuator 1606. First rays 1702 impinge upon polarizer 1704 to produce polarized rays that pass through liquid crystal layer 1706. Polarizer 1704 may for instance be a reflective-type polarizer. Reflective polarizers often include sub-wavelength spaced parallel conductors that allow the polarization parallel to their orientation to pass while reflecting the polarization component perpendicular to their orientation. An example of such a polarizer is disclosed in U.S. Pat. No. 6,449,092, entitled REFLECTIVE POLARIZERS HAVING EXTENDED RED BAND EDGE FOR REDUCED OFF AXIS COLOR, hereby incorporated by reference. In some embodiments, reflected beams 1704 are reflected forward by reflector 1604 to pass through diffuser 1716 to form non-variable illumination 404. In other embodiments, polarizer layer 1704 or reflector 1604 may include a polarization rotation medium such as a quarter-wave plate to rotate an additional portion of light 1702 into the correct polarization for passage through polarizer 1704. This arrangement effectively recycles a portion of rejected light energy and increases the proportion of light 1702 that passes through variable attenuator 1606 and decreasing the portion of light emitted as non-variable illumination 404.

Liquid crystal layer 1706 includes individually controllable cells 1608 that for instance affect the polarization direction of light passed therethrough. After passing through liquid crystal layer 1706, light impinges upon analyzer 1708. Depending upon the control signals applied to individual cells 1608, light may be attenuated a little or may be attenuated significantly. For example, non-variable light ray 1702a passes through cell 1608a, which controls the light's polarization direction to pass a significant proportion through analyzer 1708 to produce bright variable illumination beam 1710a, In contrast, non-variable light ray 1702b passes through cell 1608b. Cell 1608b selects the polarization direction of the light to pass a small proportion through analyzer 1708 to produce dim variable illumination beam 1710b.

Several variants of liquid crystal shutters are known to the art including nematic, smectic, and ferromagnetic. In principal, many types of liquid crystal devices may be used in the present embodiment or in the embodiment of FIG. 16, the choice affecting only details of illuminator fabrication rather than any basic principles.

Optional output optic 1712 may alter the paths of variable illumination beams 1710a and 1710b to produce illumination beams 110a and 110b, respectively. In the example of FIG. 17, variable illumination beam 1710a and corresponding illumination beam 110a are shown with long dashes, indicating relatively high power arising from the minimal attenuation imparted by cell 1608a. Correspondingly, variable illumination beam 1710b and associated illumination beam 110b are shown with short dashes, indicating relatively low power arising from the significant attenuation imparted by cell 1608b.

Figure 18:
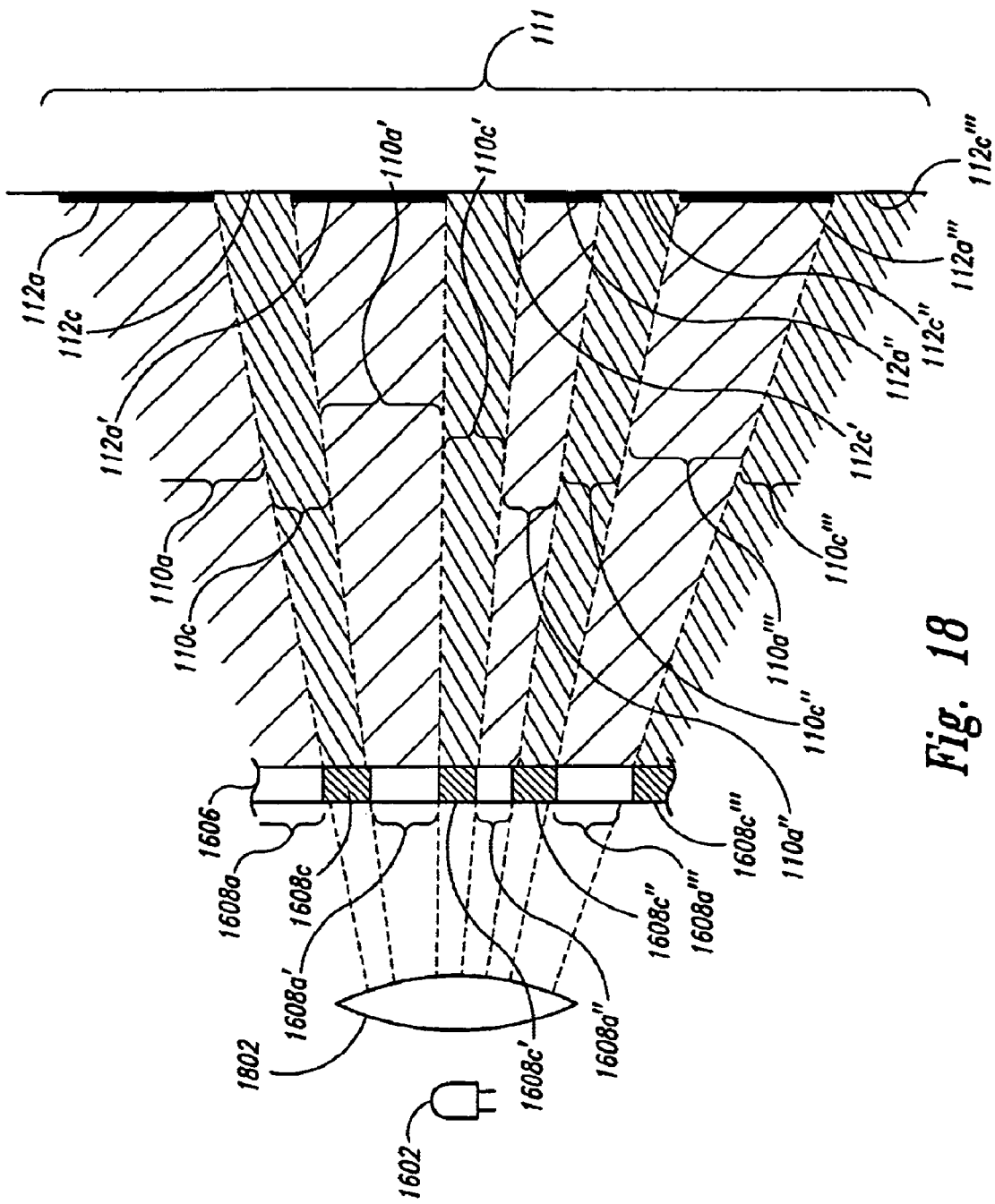
FIG. 18 is a diagram showing a variable attenuator casting shadows on a field of view.

FIG. 18 is a diagram shown in cross-section that illustrates the converged illumination pattern created by a variable illuminator 109 onto a FOV comprising alternating light and dark regions. Light source 1602, here illustrated as an LED, shines illumination through optional optical element 1802 through a variable attenuator 1606 onto a FOV 111. FIG. 18 is shown in a state it might reach after convergence. In this state, variable attenuator 1606 comprises several non-attenuated portions 1608a, 1608a', 1608a', and 1608a''' which pass relatively bright rays of light 110a, 110 a', 110a'', and 110a''', respectively on to dark regions 112a, 112a', 112a'', and 112a''', respectively. Inter-digitated between non-attenuated portions 1608a (here intended to refer to the collective of non-attenuated portions) of variable attenuator 1606 are attenuated portions 1608c, 1608c', 1608c'', and 1608c''' which form shadows (or pass attenuated rays of light) 110c, 110c', 110c'', and 110c''', respectively on to light regions 112c, 112c', 112c'', and 112c''', respectively. This pattern of bright light and shadows results in relatively uniform signal return to a detector.

It can be seen in FIG. 18 that the pattern of transmissive and obscure portions 1608 in variable attenuator 1606 forms what is essentially an inverse image of the FOV. By extension then, the electrical or digital pattern in the electronics that drive regions 1608 also forms and inverse image of the FOV. For the case of a bar code scanner, this electrical or digital pattern in the electronics may be conveniently used as the basis for decode algorithms.

Figure 19:
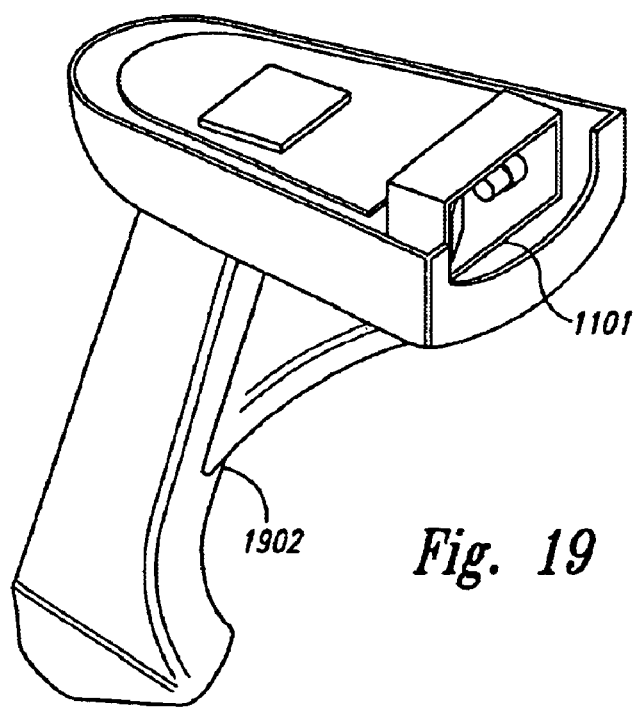
FIG. 19 is an isometric view of a scanned beam imager having a scanned beam engine.

FIG. 19 is an isometric view of a scanned-beam imaging engine 1101 in a hand-held imager 1902 such as one used for reading 1D and 2D bar code symbols, reading OCR, capturing signatures, and other enterprise activities. In one mode, the scanned-beam imaging engine 1101 includes a microcontroller that has an interface that emulates a CCD or CMOS scan engine. This mode may be especially useful to reduce time-to-market for applications involving replacement of CCD or CCD image capture sections in existing products. Another mode includes a native interface that may offer higher performance features unique to a scanned beam imaging engine. For instance, the first mode may enable constant illumination while the second mode enables variable illumination for extended depth-of-field and/or dynamic range.

FIG. 20 is a block diagram showing an embodiment where illumination and detection are performed by separate modules or separate bodies with limited or no intra-frame communication therebetween. First module 2002 comprises frame buffer 202, which drives variable illuminator 109 as per FIG. 2. Light scattered or reflected by the FOV is detected by detector 116 in second module 2004. Detector 116 is coupled to communications interface 2006, which returns detected pixel values from second module 2004 to inter-frame processor 216 through inverter 214 in first module 2002. Interframe processor 216 combines the previous frame buffer values with returned inverted detected values, for instance adding, and reloads frame buffer 202 with updated values. The process of illumination, detection, communication, inversion, and combining is then repeated until the image is converged according to appropriate rules. Appropriate rules for full convergence, dynamic range compression, etc. are discussed elsewhere in this document. Either first module 2002 or second module 2004 may include optional static illuminator 402. First module 2002 and second module 2004 may be separate physical bodies, separate electrical modules, separate logical modules, or may be integrated.

FIG. 21 is an isometric view of an embodiment of FIG. 20 where second body 2004 is a camera and first body 2002 is a separable illuminator or "flash" unit. In this example, flash unit 2004 includes a first illuminator region 2102 for emitting variable illumination and a second illuminator region 2104 for emitting static illumination. In embodiments corresponding to the block diagram of FIG. 20, the user depresses a shutter button 2101 on the camera 2002. In accordance with exposure logic in the camera it may choose to use flash. In this case flash unit 2004 illuminates the scene and a frame is captured by the detector in camera 2002. The frame is sent to the flash unit 2004, and the flash unit performs logic illustrated by the block diagram of FIG. 20. If "modified fill flash" or leveling is required, the camera captures a second frame while static illumination and variable illumination are operative. Optionally, the amount of static illumination may be decreased from the first frame to allow for the additional illumination and greater dynamic range of the variable illuminator. The second frame is then sent to flash unit 2004 and the process repeated until proper illumination balance is achieved.

Camera 2002 may be a still or a video camera. Additionally, flash unit 2004 may be integrated into the camera body. Finally, it may be desirable for the illuminator 2004 to have its own detection system. This may be especially valuable for cameras used for sports or other action photography where it is desirable to have intra-frame processing and convergence acceleration for faster response.

Figure 22:
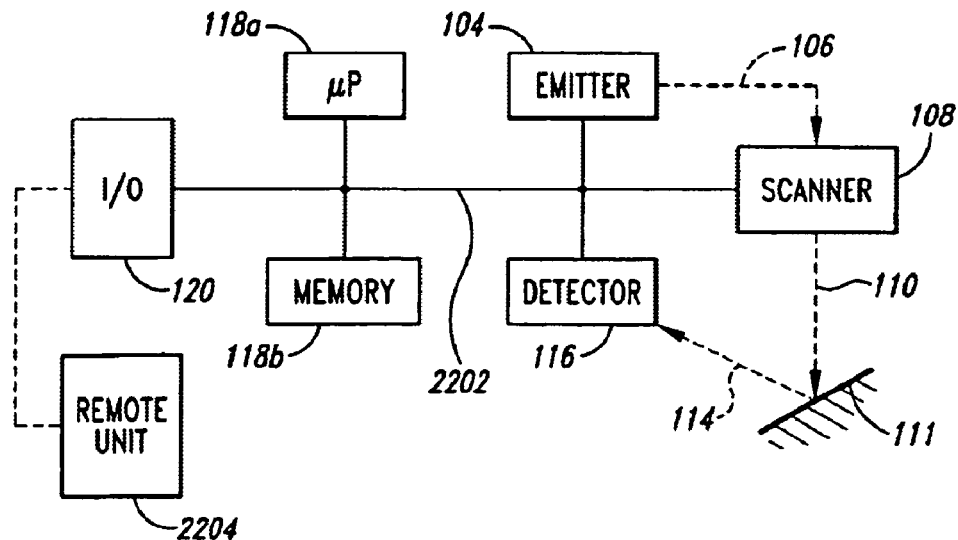
FIG. 22 is a block diagram of a variable illuminator or scanned beam imager.

FIG. 22 is an electrical block diagram showing one embodiment according to the present invention, drawing particular attention to an embodiment where the controller 118 is distributed into microprocessor 118a and memory 118b blocks connected to one another and to emitter 104, scanner. 108, and detector 116 by buss 2202. Interface block 120 may for instance include wired and wireless data interfaces; visible indicators, audio indicators, tactile indicators, and/or displays; input means such as temperature sensors, ambient light sensors, trigger, orientation and/or location sensors, remote memory or storage, a keyboard, mouse, microphone, and/or other devices for communicating operatively relevant information.

Optional remote unit 2204 may be connected to interface 120 by wired or wireless means including a networked or Internet connection. The nature of remote unit 2204 may be determined based on application requirement. For example, a remote expert comprising artificial intelligence and/or humans may be useful when the embodiment involves image analysis such as medical imaging or machine vision. A remote decoder may be used to advantage in a bar code or OCR reading application. Multiple imagers may be networked to one or a plurality of remote units.

Figure 23:
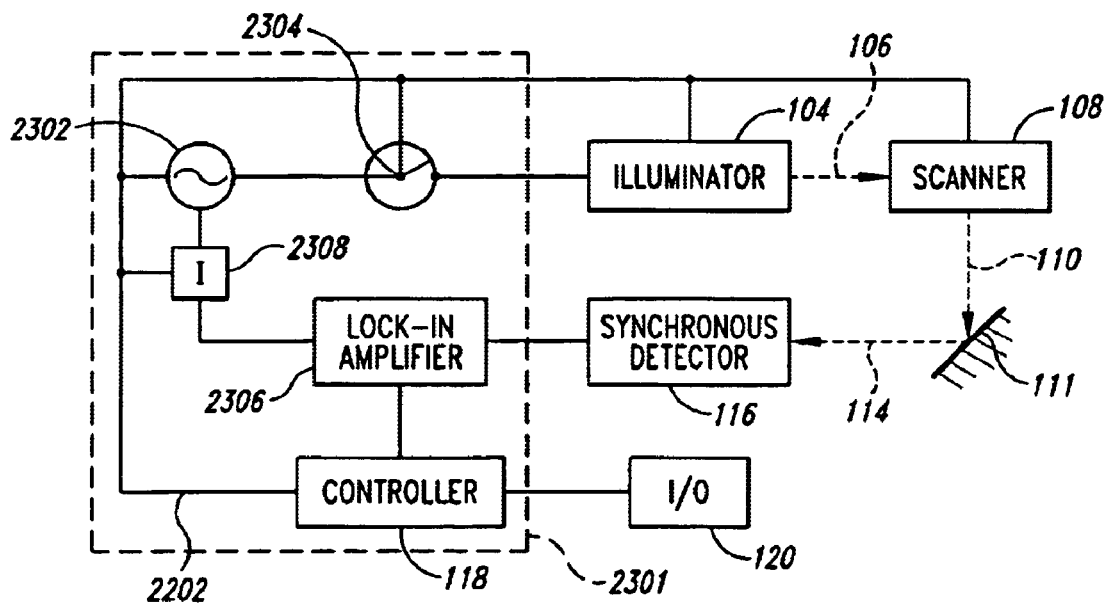
FIG. 23 is a block diagram of a synchronous scanned beam imager where the illuminator and detector are pulsed synchronously.
Figure 24:
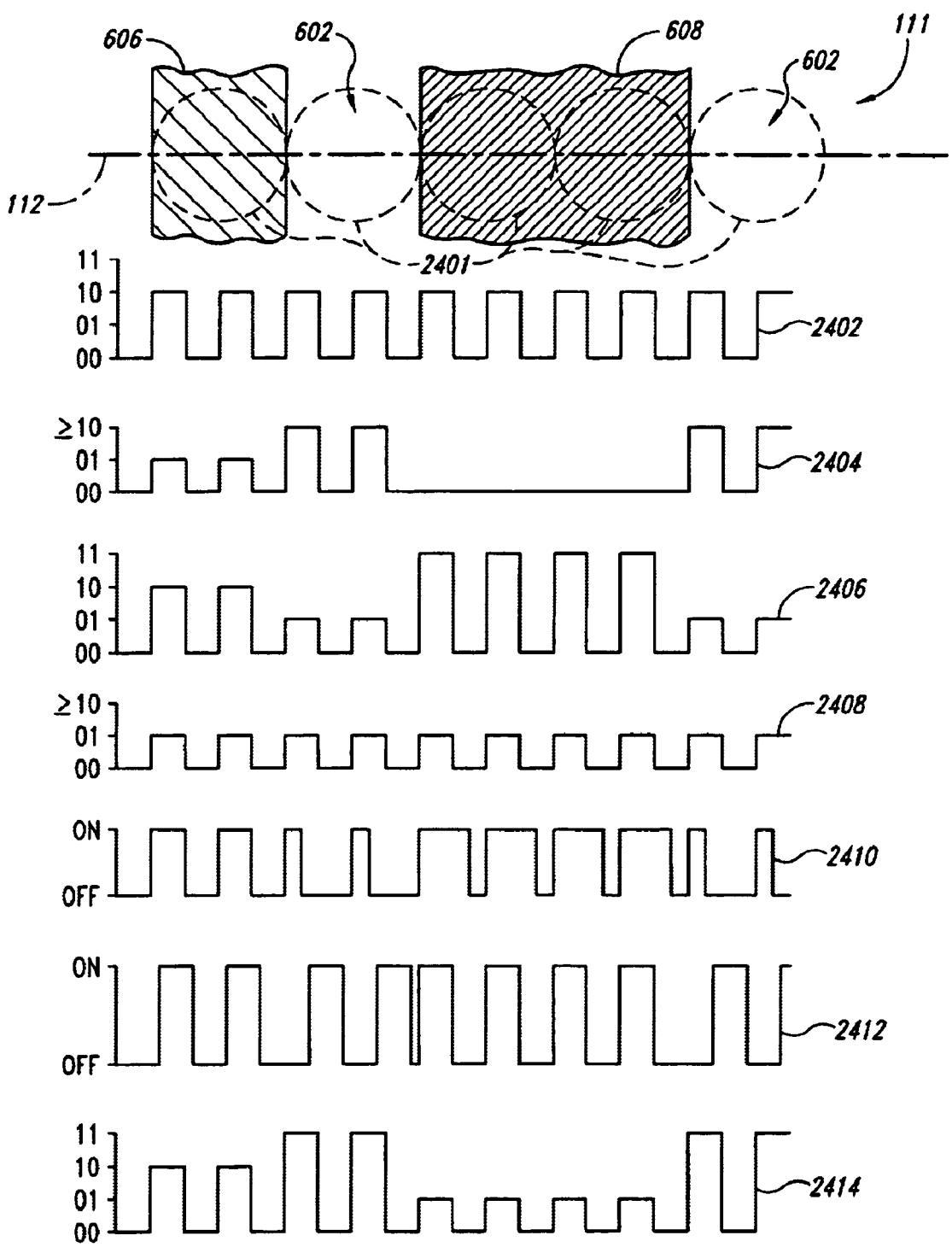
FIG. 24 is a diagram showing pulsed illuminator and detector waveforms of a synchronous scanned beam imager.

FIG. 23 is a block diagram of an embodiment that uses a synchronous illuminator and detector. Timer-controller 2301 controls the synchronization of the illuminator(s) 104 and detector(s) 116. Functional implications of this and alternative synchronous embodiments are illustrated in FIG. 24.

Embodiments related to FIG. 23 pulse the illuminator. The detector is then "tuned" to the pulse rate of the illuminator. When a detector 116 coupled with a circuit that makes it sensitive to a signal modulated at the same frequency as the illuminator, the system may be referred to as a synchronous detector 2305. Timer-controller 2301 comprises an RF source 2302 that may be controlled by controller 118. RF source 2302 modulates the illuminator 104, which outputs a modulated beam 106 that is deflected by scanner 108 to produce scanned beam 110. In some embodiments, illuminator 104 is a red laser diode of the type typically used in bar code scanners. Such bar code scanners may, for example, use a red laser diode having a wavelength between 635 and 670 nanometers with a rated power output of 10 to 30 milliwatts.

Scanner 108 may be one or a combination of several types of scanners capable of producing an appropriate scan rate. In some embodiments, scanner 108 is a MEMS mirror.

Scanned beam 110 scans FOV 111 and is reflected or scattered back as reflected beam 114 to synchronous detector 2305. Synchronous detector 2305 is tuned to detect the pulse modulation frequency of illuminator 104. Light may be collected by collection optics (not shown). Collection may be made retro-collectively, confocally, or may be made via staring optics. The staring optics may use reflectors, lenses, filters, vignetting structures, or combinations thereof. Non-imaging collection optics are described for example in the book entitled "High Collection Nonimaging Optics" by W. T. Welford and R. Winston, 1989, Academic Press.

One way to tune a detector 116 to a pulse modulation frequency is to use lock-in amplifier 2306, which amplifies a signal at one or more particular frequencies. Lock-in amplifier 2306 may include circuitry to convert the detected modulated signal to base band or, alternatively, may pass a modulated signal to the controller. The controller converts the signal into an image and performs other necessary functions appropriate for the application.

Lock-in amplifier 2306 is of the type that is sensitive to one or more particular frequencies. The frequency or frequency range to which the lock-in amplifier is sensitive may be predetermined or the RF source 2302 may optionally be fed back to the lock-in amplifier. The RF source may optionally be fed back to the lock-in amplifier via optional delay line 2308. Optional delay line 2308 may optionally be a variable delay line controlled by controller 118. Lock-in amplifier 2306 may be of a design that locks into the frequency of the illuminator pulse modulation and follows it through any variation. One type of such design is a phase-locked loop, which may be implemented as a heterodyne design, for example.

Optional modulator 2304 may apply modulation to the RF signal generated by RF source 2302, thus driving illuminator 104 with a modulated RF signal. Some or all of RF source 2301, optional modulator 2304, illuminator 2308, and optional interface 120 may be under control of controller 118, for example via control lines 2202.

The RF drive signal produced by timer-controlled 2301 effectively produces a carrier frequency that tunes illuminator 104 and synchronous detector 2305 to each other and helps to reject ambient noise and provide other benefits, some of which are described herein.

Scanned beam imagers often have data rates on the order of 20 MHz. One way to operate a synchronous detector with a scanned beam imager is to pulse the beam at a frequency that is high compared to the data rate. For instance, the beam may be modulated at a rate of 20 to 200 times the data rate, resulting in a pulse rate of 400 MHz to 4 OHz. Such high pulse rates can be a challenge for detectors, however, often resulting in significant photon shot noise as well as practical design difficulties. In a preferred embodiment, the pulse rate may be run at a small multiple of data rate, for example at 1 to 10 times the data rate, resulting in a more manageable pulse rate of 20 to 200 MHz.

The device of FIG. 23 may operate at a pre-determined pulse frequency. It may desirable, particularly in low frequency multiple embodiments, to maintain a constant phase relationship between pixel clocking and synchronous pulse modulation in order to ensure an equal number of pulse modulation cycles. However, preferred resonant scanning technologies do not have constant rotational velocities.

For resonant scanning systems, constant frequency pulse modulation may be used with constant pixel clock rate and variable pixel spacing. In this mode, it may be desirable to apply image processing to interpolate between actual sample locations to produce a constant pitch output. In this case, the addressability limit is set at the highest are over-sampled. In general, linear interpolation, applied two-dimensionally where appropriate, has been found to yield good image quality and have a relatively modest processing requirement.

Alternatively, constant pixel spacing may be maintained by varying both pixel clocking and synchronous pulse modulation frequency. Methods and apparatus for varying pixel clocking across a FOV are described in U.S. patent application Ser. No. 10/118,861 entitled ELECTRONICALLY SCANNED BEAM DISPLAY by Gregory Scott Bright, Scott W. Straka, Philip C. Black, James G. Moore, John R. Lewis, Hakan Urey, and Clarence T. Tegreene, filed Apr. 9, 2002, commonly assigned and hereby incorporated by reference.

By using a clock divider (for frequency ratios greater than 1:1) or a second clock, one may use the apparatus disclosed therein to also control pulse modulation frequency synchronously with pixel clocking.

Varying the pulse modulation frequency sinusoidaliy produces a chirp that may be useful for further improving noise immunity. In effect, this creates frequency diversification that acts in a manner similar to spread spectrum radio systems. This may be particularly useful when two or more of the systems of FIG. 23 are used in proximity to one another.

Pulse modulation frequency diversification may also or alternatively be implemented by varying the ratio of modulation frequency to pixel frequency. This may be done on a frame-by-frame, line-by-line, or even a pixel-by-pixel basis. This type of modulation frequency diversification is particularly akin to frequency hopping spread spectrum radio systems. A programmable clock divider may be used to set the frequency ratio.

FIG. 24 is a diagram showing exemplary waveforms for a synchronous illuminator and detector. Note that for clarity, scale designators and correspondence to particular shades of gray have been changed from the non-synchronous case presented in FIG. 6a. Idealized scanned detection spot or picel 2401 is shown at various positions along scan path 112 in FOV 111. Thus, scan path 112 may be thought of as representing both a spatial axis and a time axis. For purposes of clarity, various complications including elongation in the scanning directions are omitted. FOV 111 is shown having, right-to-left, a medium gray region 606, a light region 602, a dark gray region 608, and a light region 602. Waveforms 2402 through 2412 are shown aligned below corresponding detection spot location times.

Waveform 2402 represents an initial synchronous illumination waveform. It can be seen that the illuminator power is chopped twice per pixel position. Thus FIG. 24 represents a case where synchronous chopping is performed at a frequency equal to twice the pixel frequency.

Waveform 2404 represents an initial (pre-converged) detector response. It can be seen medium gray region 606 returns a detector signal that falls within the dynamic range of the detector. Light regions 602 return an indeterminate (high) signal designated 210. Dark gray region 608 returns an indeterminate (low) signal designated 00. Thus, only the medium gray region 606 returns a signal that falls within the dynamic range of the detector.

Waveform 2406 illustrates a converged synchronous illuminator waveform and waveform 2408 the corresponding converged (determined) detector waveform. In this case illuminating medium gray area 606 with an illuminator power of 10, illuminating light areas 602 with the power of 01, and illuminating dark gray region 608 with a power of 11 results in a determinate detector response of 01 . The alternating 00 levels in both waveforms represent the synchronous chopping of this embodiment. This embodiment corresponds to an amplitude modulated (AM) encodation.

Waveform 2410 represents an alternative method of modulating illuminator power in a synchronous system. In this case, medium gray region 606 receives "on" pulses of medium width, light regions 602 receive "on" pulses of narrow width, and dark gray region 608 receive "on" pulses of wide width. As shown, the leading edges of the illuminator "on" pulses are maintained at a constant frequency. Alternatively, the trailing edges could be maintained at a constant frequency with the leading edges being advanced or retarded in a manner inversely proportional to the apparent brightness of the pixel, or the mid-points could be maintained at a constant frequency with both the leading edges and trailing edges extending farther or nearer to the midpoints in a manner inversely proportional to the apparent brightness of the pixel, respectively. Waveform 2410 corresponds to pulse width modulated (PWM) encodation.

Waveform 2412 illustrates another alternative method of modulating illuminator power in a synchronous system. In this case, the phase of the illumination pulse 2412 is varied to produce greater or lesser coupling with the detector waveform 2408. Thus, medium gray areas 606 receive a slight phase offset, here shown as a phase delay. Similarly, light areas 602 receive a large phase offset and dark gray area 608 receives no phase offset. Accordingly, the detector "sees" a relatively powerful returned signal from light areas 602 for a short time, a medium signal from medium areas 606 for a medium time, and a relatively weak signal from dark gray region 608 for a relatively long time. This control schema corresponds to phase shift keyed (PSK) encodation. Apparent brightness encodation methods other than AM, PWM, or PSK may additionally be used.

The synchronous detection schema presented in FIG. 24 may additionally be used in embodiments where the illuminator power or coupling is not modulated. For these cases waveform 2402 represents illuminator output and waveform 2414 represents detector response. Medium gray region 606 returns to the detector a medium power signal corresponding to level 10 . Similarly, light regions 602 return high power 11 signals and dark gray region 608 returns a low power 01 signal. AM, PWM, PSK or other modulation may be used on detector sensitivity or gain by methods analogous to these used in the illuminator encoding systems described above.

The use of synchronous illuminator(s) and detector(s) creates a "carrier frequency" that is beneficial for improving system performance with respect to range, noise and ambient light immunity, cross-talk reduction, reduction in illuminator power requirements, reduction in detector bandwidth requirements, and other benefits.

While the ratio of pulse modulation frequency to pixel frequency shown in FIG. 24 is 2:1, other multiples may alternatively be used. Moreover, integer ratios are not necessarily required, although integer ratios typically simplify design and calculation.

Referring back to FIG. 23 with reference to FIG. 24, the illuminator 1-4 may be AM modulated via control line 2302. Optionally, illuminator 104 may be PWM modulated via optional modulator 2304. PSK modulation may be embodied by a variable phase RF source 2302 or a programmable delay line (not shown) inserted between RF source 2302 and illuminator 104. An alternative way of PSK encodation is to use optional programmable delay line 2308 to modify the phase of detector sensitivity while leaving the illuminator pulse phase substantially constant. RF source 2302 may optionally be replaced by a clock divider or other interface for driving sinosoidal or chirped synchronous pulse modulation from a variable pixel rate. A programmable clock divider can be used to implement a frequency ratio hopping system.

Figure 25:
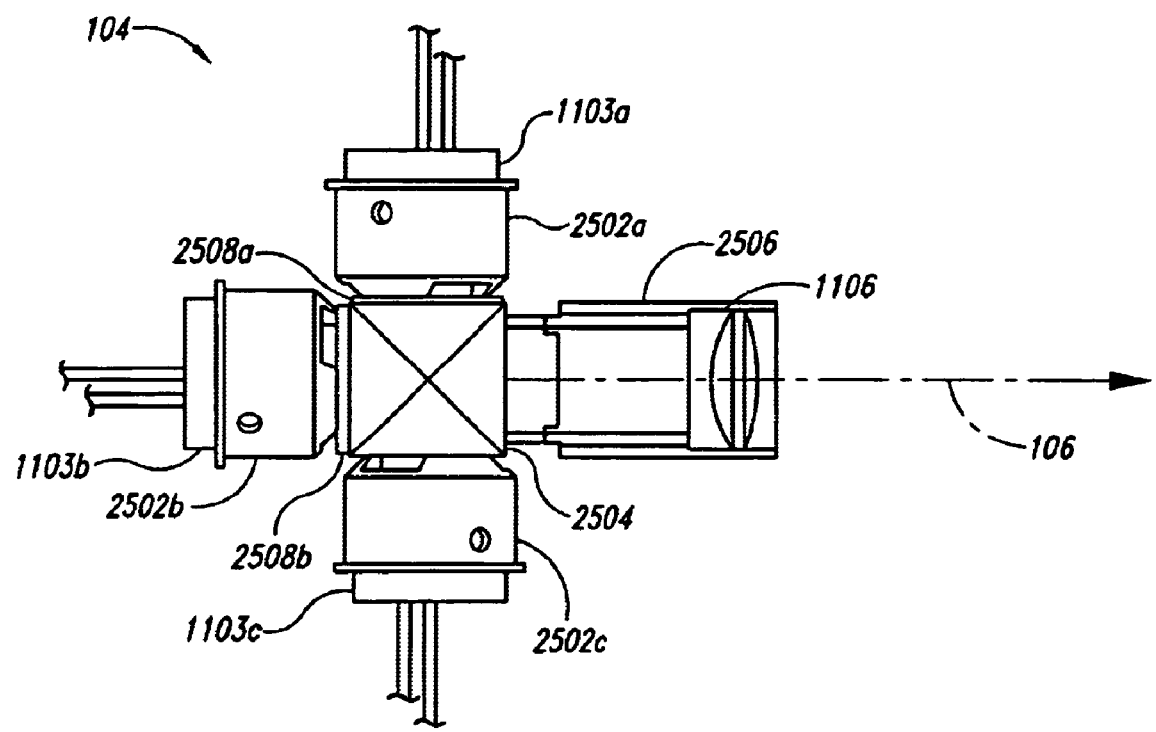
FIG. 25 is a side view of a compact three color light source where the output beams are combined by an X-cube.

FIG. 25 is a compact illuminator having three emitters. Emitters 1103a, 1103b, and 1103c, which may for instance be RGB laseres or edge-emitting LEDs are held by mounts 2502a, 2502b, and 2502c, respectively. Mounts 2502 may include provision for aligning the emitters. Light beams output by emitters 1103a, 1103b, and 1103c are combined by X-cube 2504 and output along a common axis as combined beam 106. X-cube 2504 may be a commercially available birefringent device. The output beam 106 proceeds down mounting barrel 2506 and is collimated or focused by output optic 1106, here shown as a doublet. Alternatively, output optic 1106 may be implemented as a single lens and or an aperture (not shown). Spacers 2508a and 2508b vary the optical path length between the three illuminators 1103a, 1103b, and 1103c and output optic 1106, thus compensating for chromatic aberration. The compact three color illuminator 104 or FIG. 25 may be used in combination with scanned beam embodiments shown elsewhere in this document.

High speed MEMS mirrors and other resonant deflectors are often characterized by sinusoidal scan rates, compared to constant rotational velocity scanners such as rotating polygans. Resonant deflectors may be resonant in one, two, or three axes. [An idealized bi-resonant, bi-sinusoidal scan pattern is shown in FIG. 26.] In certain instances, the scan pattern follows a bi-resonant, bi-sinusoidal scan path characterized as a Lissajous pattern. In such cases, the intersections between the vertical and horizontal lines of a rectilinear matrix, representing idealized pixel positions, may be overlaid with the bi-resonant, bi-sinusoidal scan path, representing the actual path taken by the scanned spot. Since the actual scan path doesn't align perfectly with all the rectilinear pixel positions, those values may therefore be determined by interpolating. Such applications of a bi-resonant, bi-sinusoidal scan path to rectilinearly arranged pixel positions are discussed more fully in the U.S. Patent Application entitled APPARATUS AND METHOD FOR BI-DIRECTIONALLY SWEEPING AN IMAGE BEAM IN THE VERTICAL DIMENSION AND RELATED APPARATI AND METHODS, by Margaret Brown, Marc Freeman, and John R. Lewis, application Ser. No. 10/441,916, applied for May 19, 2003, commonly assigned herewith and hereby incorporated by reference. This application discloses methods for selecting bi-resonant frequencies as well as methods for maximizing the image quality.

The preceding overview of the invention, brief description of the drawings, and detailed description describe exemplary embodiments of the present invention in a manner intended to foster ease of understanding by the reader. Other structures, methods, and equivalents may be within the scope of the invention. As such, the scope of the invention described herein shall be limited only the claims.

What is claimed is:

1. A field-of-view illuminator, comprising;
   a variable illuminator responsive to a signal to direct a first beam to a plurality of locations in a field of view,
   a detector aligned to receive energy scattered from the first beam, and
   an electronic controller operatively coupled to said detector and said variable illuminator, the electronic controller operative to automatically vary the power of the first beam inversely proportionally to the received energy
   wherein said variable illuminator includes;
   a beam source responsive to a signal to produce a second beam, and
   a mirror aligned to deflect the second beam, forming the first beam that scans across the field of view.

2. The field-of-view illuminator of claim 1, further comprising;
   a frame buffer operable to contain values for driving said variable illuminator,
   a leveling circuit operatively coupled to said detector and said frame buffer, the leveling circuit being responsive to the detector to modify the values in said frame buffer.

3. The field-of-view illuminator of claim 2 wherein the leveling circuit is operative to increase the output of said variable illuminator to locations that scatter relatively low amounts of energy.

4. The field-of-view illuminator of claim 2, wherein said leveling circuit is operative to decrease the output of said variable illuminator to locations that scatter relatively high amounts of energy.

5. The field-of-view illuminator of claim 1, wherein variable illuminator is responsive to a signal to modulate its output to produce substantially uniform detected energy across the field of view and the image in the field of view is substantially represented by the inverse of a frame buffer in said controller.

6. A method for illuminating a field-of-view, comprising the steps of;
   illuminating a plurality of spots in a field of view with a first illumination pattern,
   measuring the energy scattered from each of the plurality of spots in response to the first illumination pattern,
   responsive to said measurement, automatically determining a second illumination pattern corresponding to a reduced range of scattered light energy, and
   illuminating the plurality of spots with the second illumination pattern;
   wherein said step of determining a second illumination pattern corresponding to a reduced range of scattered light energy further comprises the steps of;
   inverting the pattern of measured scattered energies from the plurality of spots, and
   adding the inverted pattern of measured scattered energies to the first illumination pattern to produce the second illumination pattern.

7. The method for illuminating a field-of-view of claim 6, wherein the process of illuminating, measuring and adjusting the illumination pattern is repeated until the range of scattered light energy is reduced to a desired range.

8. The method for illuminating a field-of-view of claim 7, wherein the desired range of scattered light energy is one that falls substantially within the dynamic range of a detector.

9. A method for illuminating a field-of-view, comprising the steps of;
   illuminating a plurality of spots in a field of view with a first illumination pattern,
   measuring the energy scattered from each of the plurality of spots in response to the first illumination pattern,
   responsive to said measurement, automatically determining a second illumination pattern corresponding to a reduced range of scattered light energy, and
   illuminating the plurality of spots with the second illumination pattern;
   wherein said step of determining a second illumination pattern corresponding to a reduced range of scattered light energy, further comprises the steps of;
   inverting the pattern of measured scattered energies from the plurality of spots, adjusting the magnitude of the inverted pattern of measured scattered energies from the plurality of spots corresponding to an adjustment gain, and adding the adjusted inverted pattern of measured scattered energies to the first illumination pattern to produce the second illumination pattern.

10. A scanned beam imager, comprising;

a frame buffer operative to produce a source signal, an emitter responsive to the source signal to emit a modulated beam of electromagnetic energy, a scanner positioned to receive the modulated beam of electromagnetic energy and operative to scan the beam across a field-of-view, a detector aligned to detect modulated electromagnetic energy scattered from the field-of-view and operative to produce a detection signal responsive to the detected modulated electromagnetic energy, and a controller coupled to said detector and said frame buffer, said controller being responsive to the detection signal to adjust values in said frame buffer;

wherein said controller is operative to converge said frame buffer such that at least a portion of image information from the field-of-view may exist as frame buffer data.

11. The scanned beam imager of claim 10, wherein the field-of-view is two-dimensional.

12. The scanned beam imager of claim 10, wherein said controller further comprises;

a bar code decoder.

13. The scanned beam imager of claim 10, wherein said controller further comprises;

a leveling circuit operative to load values into said frame buffer responsive to the amount of electromagnetic energy received by said detector.

14. The scanned beam imager of claim 10, wherein;

the frame buffer is operative to converge such that substantially all the image information from said field-of-view exists as frame buffer data.

* * * * *